(12) United States Patent
Jimbo et al.

(10) Patent No.: US 9,445,350 B2
(45) Date of Patent: Sep. 13, 2016

(54) CALL CONTROL SYSTEM, MOBILE STATION AND CALL RESTRICTION METHOD

(71) Applicant: FUJITSU LIMITED, Kawasaki-shi, Kanagawa (JP)

(72) Inventors: Kazuya Jimbo, Kawasaki (JP); Masako Goto, Kawasaki (JP); Masahiko Shirota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 14/092,094

(22) Filed: Nov. 27, 2013

(65) Prior Publication Data

US 2014/0213236 A1 Jul. 31, 2014

(30) Foreign Application Priority Data

Jan. 30, 2013 (JP) .................................. 2013-015717

(51) Int. Cl.
*H04M 3/00* (2006.01)
*H04W 48/04* (2009.01)
*H04W 4/02* (2009.01)
(Continued)

(52) U.S. Cl.
CPC .............. *H04W 48/04* (2013.01); *H04M 3/436* (2013.01); *H04W 4/021* (2013.01); *H04W 4/16* (2013.01); *H04M 2203/2072* (2013.01); (Continued)

(58) Field of Classification Search
CPC ....... H04W 48/04; H04W 4/02; H04W 4/22; H04W 28/0289; H04W 88/06; H04W 48/02; H04W 48/06; H04W 48/08; H04W 48/12; H04W 28/0284; H04W 28/10; H04W 36/22; H04W 36/32; H04W 4/00; H04W 4/021; H04W 4/027; H04L 41/147; H04L 43/106; H04L 47/724; H04L 47/781; H04L 47/821; H04L 65/1046; H04L 41/0896; H04M 2242/28; H04M 7/0057
USPC ........................................................ 455/418
See application file for complete search history.

(56) References Cited

U.S. PATENT DOCUMENTS 6,055,564 A * 4/2000 Phaal ............................ 709/207
2007/0253407 A1* 11/2007 Wang et al. ................... 370/352
(Continued)

FOREIGN PATENT DOCUMENTS

| JP | 2007-181151 | 7/2007 |
| JP | 2011-249872 | 12/2011 |
| WO | 2008/126280 A1 | 10/2008 |

OTHER PUBLICATIONS

Japanese Office Action issued Aug. 1, 2016 in corresponding Japanese Patent Application No. 2013-015717.

*Primary Examiner* — Nimesh Patel
(74) *Attorney, Agent, or Firm* — Staas & Halsey LLP

(57) ABSTRACT

A control system includes: a storage device configured to store a list of priority callees for a plurality of mobile stations; and a controller configured to execute a procedure, including determining, based on call restriction information for call-restricted areas in which a plurality of restricted mobile stations and priority callees included on the list for the restricted mobile stations are respectively located, an allowed calling time period in which calling is allowed to the priority callees on the list for the restricted mobile stations, the restricted mobile stations being a plurality of the mobile stations located in a call-restricted area, and transmitting information indicating the allowed calling time period to the restricted mobile stations.

14 Claims, 50 Drawing Sheets

(51) Int. Cl.
  *H04W 4/16* (2009.01)
  *H04M 3/436* (2006.01)
  *H04W 4/22* (2009.01)
  *H04W 48/08* (2009.01)

(52) U.S. Cl.
  CPC .... *H04M 2242/28* (2013.01); *H04M 2242/30* (2013.01); *H04W 4/22* (2013.01); *H04W 48/08* (2013.01)

(56) References Cited

U.S. PATENT DOCUMENTS

| | | | |
|---|---|---|---|
| 2008/0291830 A1* | 11/2008 | Pernu et al. | 370/236 |
| 2009/0252303 A1* | 10/2009 | Agarwal | 379/37 |
| 2010/0014652 A1 | 1/2010 | Yasuda | |
| 2012/0044817 A1* | 2/2012 | Harper et al. | 370/252 |
| 2015/0006710 A1* | 1/2015 | Sauerwald et al. | 709/224 |

\* cited by examiner

FIG. 17

| No | NAME | NUMBER | AREA | RESTRICTION | PURPOSE |
|---|---|---|---|---|---|
| 0 | A | 080- | | | |
| 1 | FATHER | 090- | | | |
| 2 | WIFE | 070- | | | |

FIG. 18

| No | NAME | NUMBER | AREA | RESTRICTION | PURPOSE |
|---|---|---|---|---|---|
| 0 | A | 080- | NAKAHARA | | |
| 1 | FATHER | 090- | KOSUGI | | |
| 2 | WIFE | 070- | SHINJUKU | | |

FIG. 19

| AREA | RESTRICTION STATE | RESTRICTION REASON |
|---|---|---|
| NAKAHARA | RESTRICTED | DISASTER |
| KOSUGI | RESTRICTED | DISASTER |
| MIZONOKUCHI | RESTRICTED | DISASTER |
| SHINJUKU | UNRESTRICTED | — |
| YOKOHAMA | UNRESTRICTED | — |
| MAKUHARI | RESTRICTED | EVENT |

FIG. 20

| No | NAME | NUMBER | AREA | RESTRICTION | PURPOSE |
|---|---|---|---|---|---|
| 0 | A | 080- | NAKAHARA | NO | — |
| 1 | FATHER | 090- | KOSUGI | YES | EVENT |
| 2 | WIFE | 070- | SHINJUKU | YES | DISASTER |

FIG. 23

| CALLER | CALLEE | PHONE NUMBER | AREA | RESTRICTION STATE | RESTRICTION REASON | IMPORTANCE |
|---|---|---|---|---|---|---|
| USER A | — | 090-xxxx-xxxx | NAKAHARA | RESTRICTED | DISASTER | |
| — | USER A'S FATHER | 044-xxx-xxxx | KOSUGI | RESTRICTED | DISASTER | |
| — | USER A'S WIFE | 090-xxxx-xxxx | SHINJUKU | UNRESTRICTED | — | |
| — | USER A'S CHILD | 080-xxxx-xxxx | YOKOHAMA | UNRESTRICTED | — | |
| — | USER A'S FRIEND | 070-xxxx-xxxx | NAKAHARA | RESTRICTED | DISASTER | |

FIG. 24

| CALLER | CALLEE | PHONE NUMBER | AREA | RESTRICTION STATE | RESTRICTION REASON | IMPORTANCE |
|---|---|---|---|---|---|---|
| USER B | — | 090-xxxx-xxxx | NAKAHARA | RESTRICTED | DISASTER | |
| — | USER B'S FRIEND | 090-xxxx-xxxx | MIZONOKUCHI | RESTRICTED | DISASTER | |
| — | USER B'S MOTHER | 090-xxxx-xxxx | NAKAHARA | RESTRICTED | DISASTER | |
| — | USER B'S WIFE | 045-xxx-xxxx | YOKOHAMA | UNRESTRICTED | — | |
| — | USER B'S FATHER | 070-xxxx-xxxx | NAKAHARA | RESTRICTED | DISASTER | |

FIG. 25

| CALLER | CALLEE | PHONE NUMBER | AREA | RESTRICTION STATE | RESTRICTION REASON | IMPORTANCE |
|---|---|---|---|---|---|---|
| USER C | — | 090-xxxx-xxxx | KOSUGI | RESTRICTED | DISASTER | |
| — | USER C'S GRANDMOTHER | 090-xxxx-xxxx | NAKAHARA | RESTRICTED | DISASTER | |
| — | USER C'S MOTHER | 090-xxxx-xxxx | SHINJUKU | UNRESTRICTED | — | |
| — | USER C'S OLDER SON | 080-xxxx-xxxx | MIZONOKUCHI | RESTRICTED | DISASTER | |
| — | USER C'S OLDER DAUGHTER | 080-xxxx-xxxx | YOKOHAMA | UNRESTRICTED | — | |

FIG. 26

| CALLER | CALLEE | PHONE NUMBER | AREA | RESTRICTION STATE | RESTRICTION REASON | IMPORTANCE |
|---|---|---|---|---|---|---|
| USER D | — | 090-xxxx-xxxx | MIZONOKUCHI | RESTRICTED | DISASTER | |
| — | USER D'S WIFE | 090-xxxx-xxxx | MAKUHARI | RESTRICTED | EVENT | |
| — | USER D'S OLDER SON | 090-xxxx-xxxx | SHINJUKU | UNRESTRICTED | — | |
| — | USER D'S OLDER DAUGHTER | 080-xxxx-xxxx | YOKOHAMA | UNRESTRICTED | — | |
| — | USER D'S YOUNGER SON | 090-xxxx-xxxx | NAKAHARA | RESTRICTED | DISASTER | |

FIG. 27

| CALLER | CALLEE | PHONE NUMBER | AREA | RESTRICTION STATE | RESTRICTION REASON | IMPORTANCE |
|---|---|---|---|---|---|---|
| USER E | — | — | YOKOHAMA | UNRESTRICTED | — | |
| — | USER E'S CHILD | 070-xxxx-xxxx | KOSUGI | RESTRICTED | DISASTER | |
| — | USER E'S WIFE | 090-xxxx-xxxx | NAKAHARA | RESTRICTED | DISASTER | |
| — | USER E'S FATHER | 080-xxxx-xxxx | KOSUGI | RESTRICTED | DISASTER | |
| — | USER E'S OLDER DAUGHTER | 080-xxxx-xxxx | NAKAHARA | RESTRICTED | DISASTER | |

FIG. 28

| CALLER | CALLEE | PHONE NUMBER | AREA | RESTRICTION STATE | RESTRICTION REASON | IMPORTANCE |
|---|---|---|---|---|---|---|
| USER F | — | 080-xxxx-xxxx | MAKUHARI | RESTRICTED | EVENT | |
| — | USER F'S WIFE | 090-xxxx-xxxx | KOSUGI | RESTRICTED | DISASTER | |
| — | USER F'S OLDER SON | 090-xxxx-xxxx | SHINJUKU | UNRESTRICTED | — | |
| — | USER F'S OLDER DAUGHTER | 090-xxxx-xxxx | YOKOHAMA | UNRESTRICTED | — | |
| — | USER F'S YOUNGER SON | 044-xxx-xxxx | NAKAHARA | RESTRICTED | DISASTER | |

FIG. 29

| CALLER | CALLEE | IMPORTANCE |
|---|---|---|
| RESTRICTED (DISASTER) | RESTRICTED (DISASTER) | 1 |
| RESTRICTED (DISASTER) | UNRESTRICTED | 2 |
| RESTRICTED (DISASTER) | RESTRICTED (EVENT) | 2 |
| RESTRICTED (EVENT) | RESTRICTED (DISASTER) | 0 |
| RESTRICTED (EVENT) | UNRESTRICTED | 0 |
| RESTRICTED (EVENT) | RESTRICTED (EVENT) | 0 |
| UNRESTRICTED | RESTRICTED (DISASTER) | 0 |
| UNRESTRICTED | UNRESTRICTED | 0 |
| UNRESTRICTED | RESTRICTED (EVENT) | 0 |

FIG. 30

| CALLER | CALLEE | PHONE NUMBER | AREA | RESTRICTION STATE | RESTRICTION REASON | IMPORTANCE |
|---|---|---|---|---|---|---|
| USER A | — | | | | | — |
| — | USER A'S FATHER | 090-xxxx-xxxx | NAKAHARA | RESTRICTED | DISASTER | 1 |
| — | USER A'S WIFE | 044-xxx-xxxx | KOSUGI | RESTRICTED | DISASTER | 1 |
| — | USER A'S CHILD | 090-xxxx-xxxx | SHINJUKU | UNRESTRICTED | — | 2 |
| — | | 080-xxxx-xxxx | YOKOHAMA | UNRESTRICTED | — | 2 |
| — | USER A'S FRIEND | 070-xxxx-xxxx | NAKAHARA | RESTRICTED | DISASTER | 1 |

FIG. 31

| CALLER | CALLEE | PHONE NUMBER | AREA | RESTRICTION STATE | RESTRICTION REASON | IMPORTANCE |
|---|---|---|---|---|---|---|
| USER B | — | 090-xxxx-xxxx | NAKAHARA | RESTRICTED | DISASTER | 1 |
| — | USER B'S FRIEND | 090-xxxx-xxxx | MIZONOKUCHI | RESTRICTED | DISASTER | 1 |
| — | USER B'S MOTHER | 090-xxxx-xxxx | NAKAHARA | RESTRICTED | DISASTER | 1 |
| — | USER B'S WIFE | 045-xxx-xxxx | YOKOHAMA | UNRESTRICTED | — | 2 |
| — | USER B'S FATHER | 070-xxxx-xxxx | NAKAHARA | RESTRICTED | DISASTER | 1 |

FIG. 32

| CALLER | CALLEE | PHONE NUMBER | AREA | RESTRICTION STATE | RESTRICTION REASON | IMPORTANCE |
|---|---|---|---|---|---|---|
| USER C | — | — | NAKAHARA | RESTRICTED | DISASTER | 1 |
| — | USER C'S GRANDMOTHER | 090-xxxx-xxxx | NAKAHARA | RESTRICTED | DISASTER | 1 |
| — | USER C'S MOTHER | 090-xxxx-xxxx | SHINJUKU | UNRESTRICTED | — | 2 |
| — | USER C'S OLDER SON | 080-xxxx-xxxx | MIZONOKUCHI | RESTRICTED | DISASTER | 1 |
| — | USER C'S OLDER DAUGHTER | 080-xxxx-xxxx | YOKOHAMA | UNRESTRICTED | — | 2 |

FIG. 33

| CALLER | CALLEE | PHONE NUMBER | AREA | RESTRICTION STATE | RESTRICTION REASON | IMPORTANCE |
|---|---|---|---|---|---|---|
| USER D | — | 090-xxxx-xxxx | NAKAHARA | RESTRICTED | DISASTER | 1 |
| — | USER D'S WIFE | 090-xxxx-xxxx | MAKUHARI | RESTRICTED | EVENT | 2 |
| — | USER D'S OLDER SON | 090-xxxx-xxxx | SHINJUKU | UNRESTRICTED | — | 2 |
| — | USER D'S OLDER DAUGHTER | 080-xxxx-xxxx | YOKOHAMA | UNRESTRICTED | — | 2 |
| — | USER D'S YOUNGER SON | 090-xxxx-xxxx | MIZONOKUCHI | RESTRICTED | DISASTER | 1 |

FIG. 34

| CALLER | CALLEE | PHONE NUMBER | AREA | RESTRICTION STATE | RESTRICTION REASON | IMPORTANCE |
|---|---|---|---|---|---|---|
| USER E | — | 090-xxxx-xxxx | YOKOHAMA | UNRESTRICTED | — | — |
| — | USER E'S CHILD | 070-xxxx-xxxx | KOSUGI | RESTRICTED | DISASTER | 0 |
| — | USER E'S WIFE | 090-xxxx-xxxx | NAKAHARA | RESTRICTED | DISASTER | 0 |
| — | USER E'S FATHER | 080-xxxx-xxxx | KOSUGI | RESTRICTED | DISASTER | 0 |
| — | USER E'S OLDER DAUGHTER | 080-xxxx-xxxx | NAKAHARA | RESTRICTED | DISASTER | 0 |

FIG. 35

| CALLER | CALLEE | PHONE NUMBER | AREA | RESTRICTION STATE | RESTRICTION REASON | IMPORTANCE |
|---|---|---|---|---|---|---|
| USER F | — | 080-xxxx-xxxx | MAKUHARI | RESTRICTED | EVENT | 1 |
| — | USER F'S WIFE | 090-xxxx-xxxx | KOSUGI | RESTRICTED | DISASTER | 0 |
| — | USER F'S OLDER SON | 090-xxxx-xxxx | SHINJUKU | UNRESTRICTED | — | 0 |
| — | USER F'S OLDER DAUGHTER | 090-xxxx-xxxx | YOKOHAMA | UNRESTRICTED | — | 0 |
| — | USER F'S YOUNGER SON | 044-xxx-xxxx | NAKAHARA | RESTRICTED | DISASTER | 0 |

FIG. 37

| | RATIO OF IMPORTANCE 1 (POINTS FOR EACH USER) | PRIORITY RANKING (TENTATIVE) |
|---|---|---|
| USER A | 2/4 | 2 |
| USER B | 3/4 | 1 |
| USER C | 2/4 | 2 |
| USER D | 1/4 | 4 |

FIG. 38

| | RATIO OF IMPORTANCE 1 | PRIORITY RANKING (TENTATIVE) | 1ST ENTRY HAS IMPORTANCE 1? | 2ND ENTRY HAS IMPORTANCE 1? | 3RD ENTRY HAS IMPORTANCE 1? | PRIORITY RANKING (AMONG EQUALLY RANKED USERS) | PRIORITY RANKING (FINAL) |
|---|---|---|---|---|---|---|---|
| USER A | 2/4 | 2 | YES | NO | NO | 2-2 | |
| USER B | 3/4 | 1 | — | — | — | — | |
| USER C | 2/4 | 2 | YES | NO | YES | 2-1 | |
| USER D | 1/4 | 4 | — | — | — | — | |

FIG. 39

| | RATIO OF IMPORTANCE 1 | PRIORITY RANKING (TENTATIVE) | 1ST ENTRY HAS IMPORTANCE 1? | 2ND ENTRY HAS IMPORTANCE 1? | 3RD ENTRY HAS IMPORTANCE 1? | PRIORITY RANKING (AMONG EQUALLY RANKED USERS) | PRIORITY RANKING (FINAL) |
|---|---|---|---|---|---|---|---|
| USER A | 2/4 | 2 | YES | NO | NO | 2-2 | 3 |
| USER B | 3/4 | 1 | — | — | — | — | 1 |
| USER C | 2/4 | 2 | YES | NO | YES | 2-1 | 2 |
| USER D | 1/4 | 4 | — | — | — | — | 4 |

FIG. 41

| PRIORITY RANKING | USER | TIME PERIOD NAME | START TIME | END TIME |
|---|---|---|---|---|
| 1 | B | 1 | 14:10 | 14:20 |
| 2 | C | 1 | 14:10 | 14:20 |
| 3 | A | 2 | 14:20 | 14:30 |
| 4 | D | 2 | 14:20 | 14:30 |
| ... | ... | ... | ... | ... |
| 26 | Z | 13 | 16:10 | 16:20 |

FIG. 42

|  | ALLOTTED TIME PER USER |
|---|---|
| 1ST SCHEDULE | 10 MIN. |
| 2ND SCHEDULE | 15 MIN. |
| 3RD SCHEDULE | 20 MIN. |
| 4TH SCHEDULE | 25 MIN. |
| ... | ... |

FIG. 43

| | (1) TIME UNTIL TIME PERIOD ALLOCATION CYCLES THROUGH ALL USERS IN AREA | (2) ALLOTTED TIME PER USER ((1)/NUMBER OF TIME PERIODS) |
|---|---|---|
| 1ST SCHEDULE | 30 MIN. | 1 MIN. |
| 2ND SCHEDULE | 60 MIN. | 2 MIN. |
| 3RD SCHEDULE | 90 MIN. | 3 MIN. |
| 4TH SCHEDULE | 120 MIN. | 4 MIN. |
| ... | ... | ... |

CALL CONTROL SYSTEM, MOBILE STATION AND CALL RESTRICTION METHOD

CROSS-REFERENCE TO RELATED APPLICATION

This application is based upon and claims the benefit of priority of the prior Japanese Patent Application No. 2013-015717, filed on Jan. 30, 2013, the entire contents of which are incorporated herein by reference.

FIELD

The present disclosure relates to a call control system, a mobile station and a call restriction method.

BACKGROUND

When a large-scale disaster occurs, for example, users of mobile stations may attempt use a mobile station and attempt voice telephony with relations such as family and friends in order to confirm each other's safety. At this point, if users access voice telephony all at once, the mobile communication network becomes congested, and establishing a telephony link becomes difficult.

Meanwhile, a telecommunication operator may implement a call restriction in order to reduce a congested state of concentrated access to specific links by mobile station users when an event, disaster, or the like occurs. For example, in a mobile communication system applying Wideband Code Division Multiple Access (W-CDMA) as the wireless access scheme, system information including a cell access restriction is broadcast to the mobile stations administered by a base station. A mobile station receiving system information restricts telephone calls in accordance with the cell access restriction included in the system information. For example, an access restriction of 50% yields a state in which a link establishing process is executed for only 50% of the ordinary accesses from users.

For details, see Japanese Laid-open Patent Publication No. 2011-249872 and International Publication Pamphlet No. WO 2008/126280.

SUMMARY

According to an aspect of the invention, a control system includes: a storage device configured to store a list of priority callees for a plurality of mobile stations; and a controller configured to execute a procedure, including: determining, based on call restriction information for call-restricted areas in which a plurality of restricted mobile stations and priority callees included on the list for the restricted mobile stations are respectively located, an allowed calling time period in which calling is allowed to the priority callees on the list for the restricted mobile stations, the restricted mobile stations being a plurality of the mobile stations located in a call-restricted area, and transmitting information indicating the allowed calling time period to the restricted mobile stations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is an exemplary illustration of a user's priority callee list registered in a priority callee DB;

FIG. 18 is an exemplary illustration of a state in which located area information (the service area) is additionally stored in the priority callee list illustrated in FIG. 17;

FIG. 19 illustrates an example of stored content in a restriction information management DB;

FIG. 20 is an exemplary illustration of a state in which call restriction information is additionally stored in the priority callee list illustrated in FIG. 18;

FIG. 23 illustrates an example of stored content in a user A's priority callee list being stored in a priority callee DB at the time when a point calculating process starts;

FIG. 24 illustrates an example of stored content in a user B's priority callee list being stored in a priority callee DB at the time when a point calculating process starts;

FIG. 25 illustrates an example of stored content in a user Cs priority callee list being stored in a priority callee DB at the time when a point calculating process starts;

FIG. 26 illustrates an example of stored content in a user D's priority callee list being stored in a priority callee DB at the time when a point calculating process starts;

FIG. 27 illustrates an example of stored content in a user E's priority callee list being stored in a priority callee DB at the time when a point calculating process starts;

FIG. 28 illustrates an example of stored content in a user E's priority callee list being stored in a priority callee DB at the time when a point calculating process starts;

FIG. 29 illustrates an exemplary data structure of an importance calculation table;

FIG. 30 illustrates an example in which the results of an importance calculating process for a user A are stored in a list;

FIG. 31 illustrates an example in which the results of an importance calculating process for a user B are stored in a list;

FIG. 32 illustrates an example in which the results of an importance calculating process for a user C are stored in a list;

FIG. 33 illustrates an example in which the results of an importance calculating process for a user D are stored in a list;

FIG. 34 illustrates an example in which the results of an importance calculating process for a user E are stored in a list;

FIG. 35 illustrates an example in which the results of an importance calculating process for a user F are stored in a list;

FIG. 37 illustrates stored content in a work table stored in a user ranking DB;

FIG. 38 is a diagram explaining a ranking determining process for users of the same rank, and illustrates an example of content in a work table;

FIG. 39 illustrates a state in which a priority ranking is stored in the work table in FIG. 38;

FIG. 41 is a diagram explaining a schedule DB;

FIG. 42 illustrates an example of stored content in an allotted time definition DB in the case of applying a first technique;

FIG. 43 illustrates an example of stored content in an allotted time definition DB in the case of applying a second technique;

DESCRIPTION OF EMBODIMENTS

With the call restriction, which mobile stations have made calls are not taken into account. For this reason, depending on the call timings of each mobile station, an unfair situation may occur in which a given mobile station is able to conduct telephony multiple times within a given period, whereas a different mobile station is unable to conduct telephony at all. For this reason, there is a risk of congestion occurring due to respective users repeatedly redialing until a call connects.

Hereinafter, technology that enables a mobile station to secure a communication chance under a call restriction will be described with reference to the drawings. The configuration of the embodiment is given by way of example, and the present disclosure is not limited thereto.

<Network System Configuration>

Figure 1:
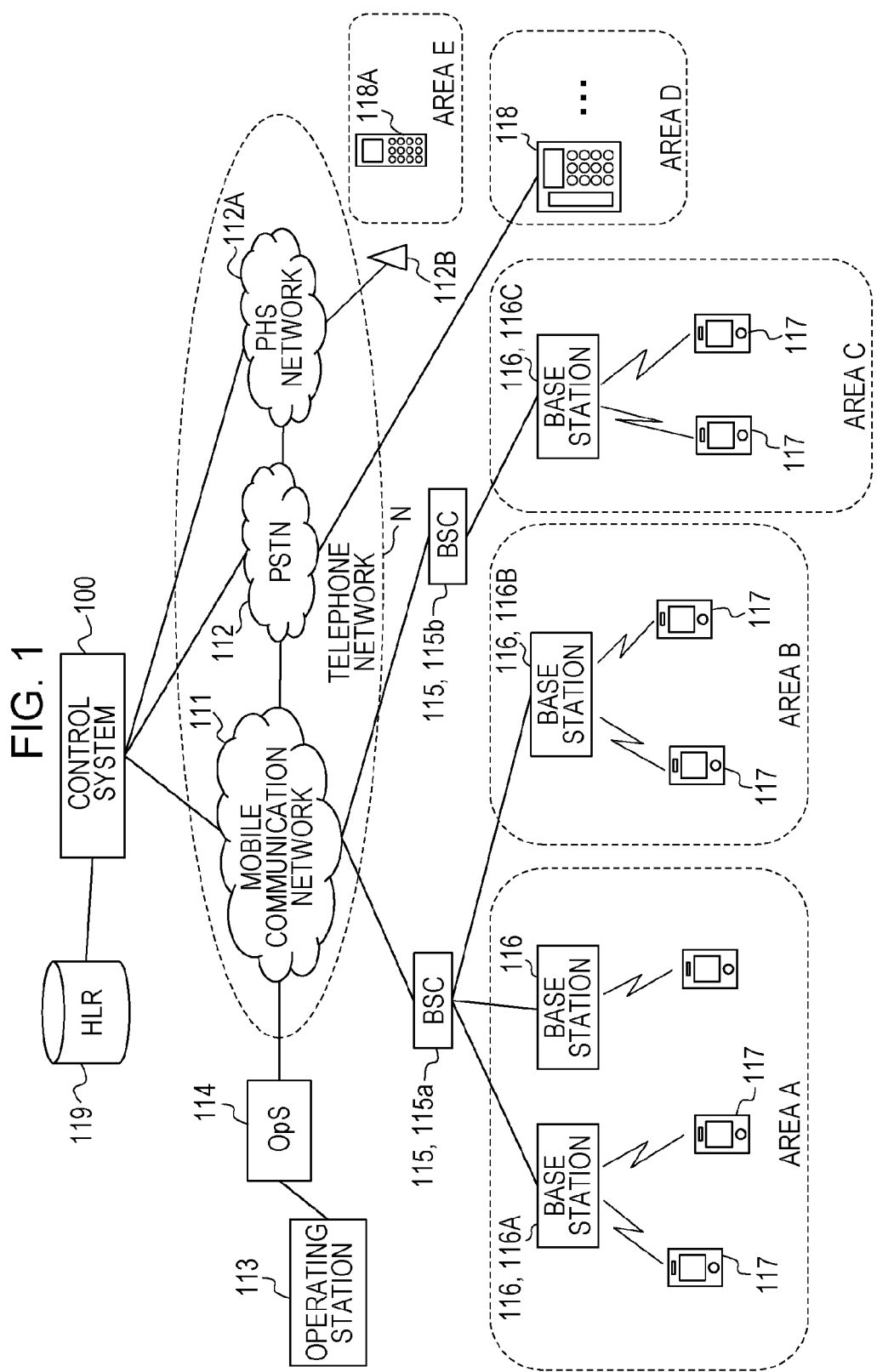
FIG. 1 is a diagram illustrating an exemplary configuration of a mobile communication system to which is applied a control system according to an embodiment.

FIG. 1 is a diagram illustrating an exemplary configuration of a mobile communication system to which is applied a control system 100 according to the embodiment. In FIG. 1, the control system 100 is connected to a telephone network N. The telephone network N includes a mobile communication network 111 at least, and may additionally include at least one of a public switched telephone network (PSTN) 112 and a Personal Handy-phone System (PHS) network 112A as illustrated in FIG. 1. Although not illustrated, the mobile communication network 111 is also connected to various packet networks such as the Internet.

Although a Wideband Code Division Multiple Access (W-CDMA) network configuration is given as an example of the mobile communication network 111 in FIG. 1, the mobile communication network 111 may also be a mobile communication network based on a different communication standard, such as a Long Term Evolution (LTE) network or an LTE-Advanced (LTE-A) network, for example.

The structural elements of the mobile communication network 111 in FIG. 1 include a home location register (HLR) 119 connected to the control system 100, one or more base station controllers (BSC; also called radio network controllers (RNC)) 115 connected to switching equipment (not illustrated) on the mobile communication network 111, and one or more base stations (BS; also called base transceiver stations (BTS) or Node B)) 116 connected to each BSC 115. The HLR 119 stores position information (located area information) on mobile stations (MS; also called user equipment (UE)) 117 registered via a mobile station 117 position registration procedure.

Also connected to the mobile communication network 111 is a management device, called an operation system (OpS) 114, that controls and manages the mobile communication network 111. The OpS 114 is connected to an operation terminal 113 that operates the OpS 114.

Each base station 116 is wirelessly connected to one or more mobile stations 117. By being connected to a base station 116, each mobile station 117 is able to conduct telephony (voice communication) using the mobile communication network 111.

The PSTN 112 includes one or multiple sets of switching equipment (not illustrated), and each set of switching equipment is connected to a landline telephone (landline station) 118. The landline telephone 118 includes a base unit and a wirelessly connected handset. The PHS network 112A accommodates a base station 112B, and the base station 112B is wirelessly connected to a PHS station 118A.

The mobile communication network 111, the PSTN 112, and the PHS network 112A are connected to each other. Thus, a mobile station 117, a landline station 118, and a PHS station 118A are able to conduct voice telephony with a station of a different type via the telephone network N.

The communication area (the area in which telephony service is provided) of the mobile communication network 111, the PSTN 112, and the PHS network 112A is divided into multiple designated areas. In FIG. 1, three areas (areas A to C) exemplify the mobile communication network 111. Also, an area D exemplifies the PSTN 112, while an area E exemplifies the PHS network 112A. The area division method is determined as appropriate. For example, the number of users in a given geographical range (a statistical value of connection conditions with respect to a base station) is used to determine the extent and range of an area. Each area is used as a unit in which to carry out a call restriction executed in response to a disaster or event.

<<Control System>>

Figure 2:
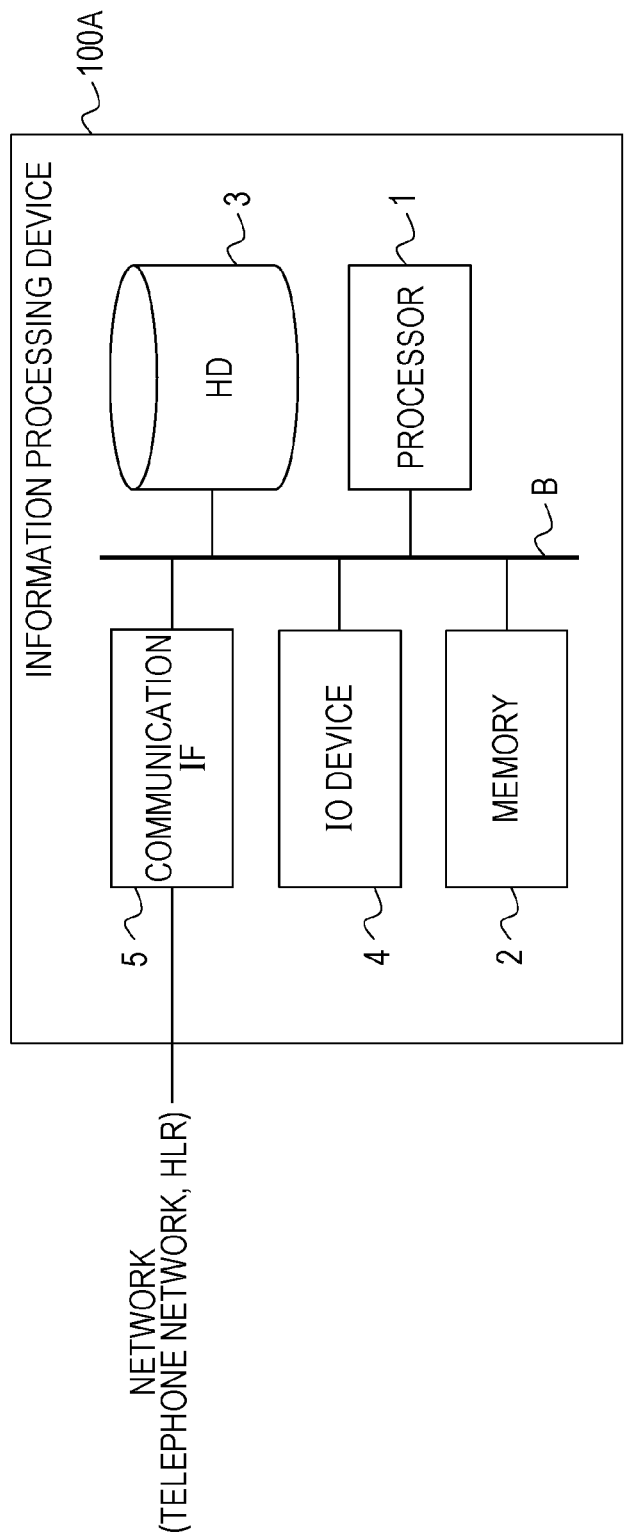
FIG. 2 is a diagram illustrating an exemplary hardware configuration of an information processing device applicable to a control system.

FIG. 2 is a diagram illustrating an exemplary hardware configuration of an information processing device 100A applicable to a control system 100. A special-purpose or general-purpose computer, such as a personal computer (PC), a workstation, or a server machine, for example, may be used as the information processing device 100A.

As illustrated in FIG. 2, for example, the information processing device 100A is equipped with a processor 1, memory 2, a hard disk (HD; includes hard drives) 3 which is an example of an auxiliary storage device, an input/output device (IO device) 4, and a communication interface circuit (communication IF) 5, which are connected to each other via a bus B. The processor 1 is an example of a controller, while the memory 2 and the HD 3 are examples of storage devices.

The processor 1 is a special-purpose or general-purpose processor, such as a central processing unit (CPU, MPU) or a digital signal processor (DSP), for example. The processor 1 is an example of a controller. The memory 2 includes a non-volatile area such as read-only memory (ROM), and a volatile area such as random access memory (RAM) or electrically erasable and programmable read-only memory (EEPROM). The memory 2 is an example of a storage device (storage medium).

The IO device 4 is connected to peripheral devices such as output devices (a display or printer) and input devices. The communication IF 5 may be a network card (network interface card), for example, and oversees a communication process with the telephone network N or the HLR 119.

The processor 1, by loading a program stored in the memory 2 or HD 3 into the memory 2 and executing the program, functions as a control system 100 that controls calling from a mobile station 117 in a call-restricted area. In the case of executing such a control-related process, the processor 1 uses data stored in the memory 2 and the HD 3.

A control system 100 according to the present embodiment is able to establish a time period (schedule) in which a mobile station 117 set as a registrant is able to call a station, for example, another 117, 118 and/or 118A, that corresponds to a priority callee that is a priority call destination, and report this schedule to that mobile station 117. The control system 100 establishes a schedule from priority callee information registered from a mobile station 117, located area information for that mobile station 117 and at least one of a mobile station 117, a landline station 118, and a PHS station 118A corresponding to a priority callee, and call restriction information for each area in the telephone network N.

Figure 3:
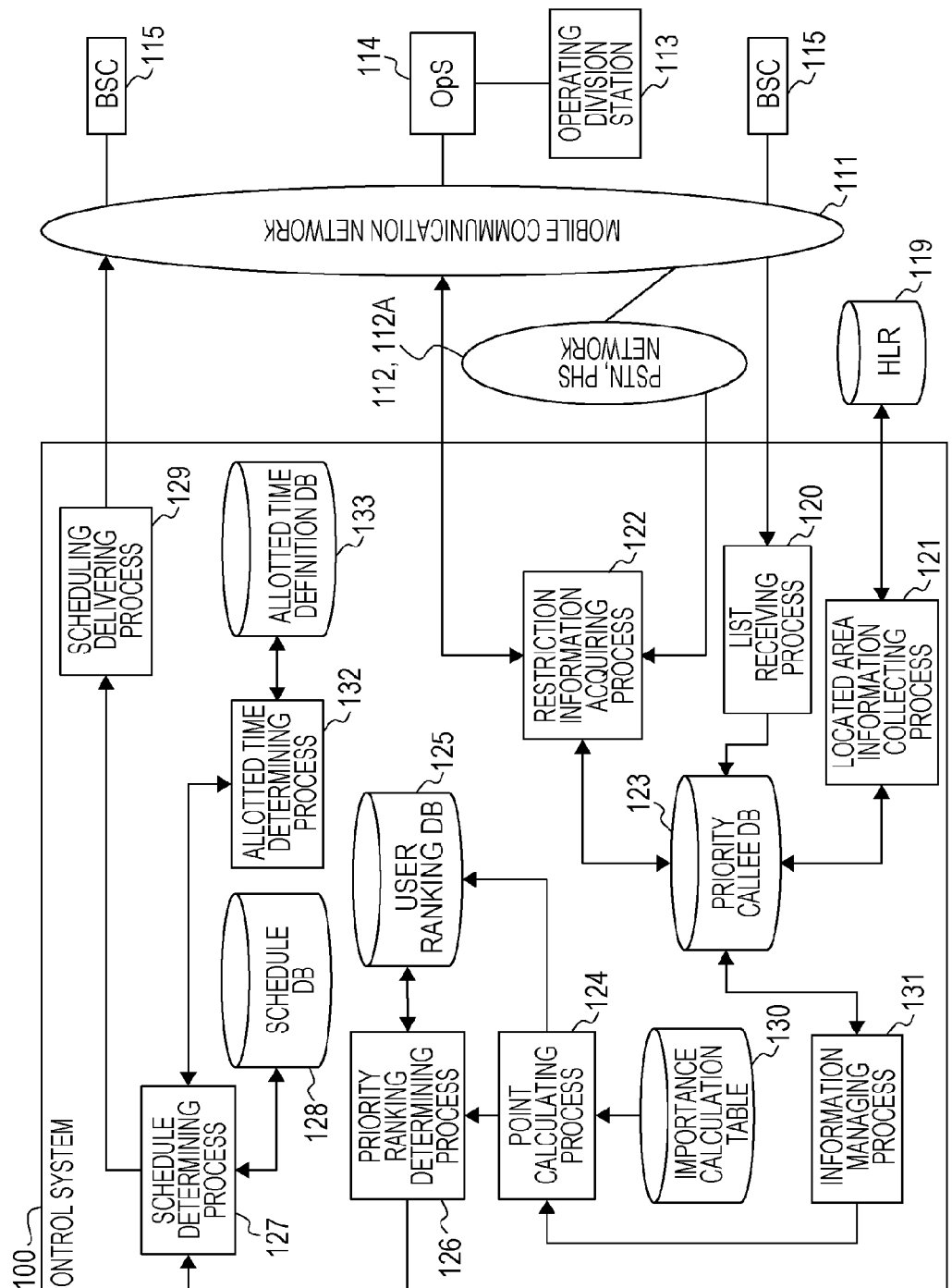
FIG. 3 is a diagram that schematically illustrates functions of a control system realized by program execution by a processor in an information processing device.

FIG. 3 is a diagram that schematically illustrates functions of a control system 100 realized by program execution by a processor 1 in an information processing device 100A. The processor 1 conducts processes for realizing a control system 100 as illustrated in FIG. 3 by program execution.

As illustrated in FIG. 3, by program execution, the processor 1 executes a list receiving process 120, a located area information collecting process 121, a restriction information acquiring process 122, an information managing process 131, a point calculating process 124, a priority ranking determining process 126, a schedule determining process 127, a scheduling delivering process 129, and an allotted time determining process 132.

Also, the priority callee database (DB) 123, the user ranking DB 125, the importance calculation table 130, the allotted time definition DB 133, and the schedule DB 128 illustrated in FIG. 3 are stored in at least one of either the HD 3 or the memory 2.

In the list receiving process 120, the processor 1 conducts a communication process with the mobile communication network 111. In other words, the processor 1 receives a list registration request message that includes priority callee information (a priority callee list, for example) from a mobile station 117, and registers the priority callee information in the priority callee DB 123. The priority callee information (priority callee list) indicates a specific mobile station 117, and one or more callees for which the user of that specific mobile station 117 desires priority calling in the case where a call restriction is carried out.

In the located area information collecting process 121, the processor 1 conducts a process of collecting (receiving) located area information for a specific mobile station 117 (the caller that is the call source) and priority callees registered in the priority callee DB 123 by the list receiving process 120. Located area information regarding a mobile station 117 may be acquired as a result of the control system 100 communicating with the HLR 119 and receiving located area information stored in the HLR 119, for example. Located area information regarding a landline station 118 or a PHS station 118A may be acquired as a result of the control system 100 communicating with and accessing a located area information management device such as switching equipment or a management server (not illustrated) residing on the PSTN 112 or the PHS network 112A. Acquired located area information is stored in the priority callee DB 123.

In the restriction information acquiring process 122, the processor 1 communicates with at least one of the mobile communication network 111, the PSTN 112, and the PHS network 112A. The processor 1 collects (receives) call restriction information indicating a call restriction or a restriction release for mobile stations 117 carried out per-area by a mobile telecommunication operator. Call restriction information is included in area information. Call restriction information regarding mobile stations 117 (the mobile communication network 111) may be acquired by accessing the OpS 114 maintained by the mobile telecommunication operator, for example. Per-area call restriction information regarding the PSTN 112 and the PHS network 112A may be acquired by accessing a management device that manages call restriction information for each area of the PSTN 112 and the PHS network 112A, such as switching equipment or a management server (not illustrated) residing on the PSTN 112 or the PHS network 112A.

A call restriction or restriction release on the PSTN 112 or the PHS network 112A is carried out for each area determined by the telecommunication operator of the PSTN 112 or the PHS network 112A, and call restriction information indicating a call restriction/restriction release for each area is registered (stored) in a management device for the corresponding network. Acquired call restriction information is stored in the priority callee DB 123.

As above, the priority callee DB 123 stores priority callee information for a specific mobile station 117, located area information for a specific mobile stations 117 and corresponding priority callees, and call restriction information indicating a call restriction/restriction release in the areas where the mobile station 117 and the priority callees are located.

In the information managing process 131, the processor 1 oversees a process of retrieving priority callee information, located area information, and call restriction information for a specific mobile station 117 stored in the priority callee DB 123. The importance calculation table 130 stores importance information given by the combination of the caller restriction state and the callee restriction state.

In the point calculating process 124, the processor 1 calculates points for each user of a mobile station 117 on the basis of the priority callee information, located area information, and per-area call restriction information stored in the priority callee DB 123, and information stored in the importance calculation table 130. Points are used as a standard for determining a priority ranking by which to assign allowed calling time periods to multiple users.

In the priority ranking determining process 126, the processor 1 determines a priority call ranking on the basis of the points of users (users having priority call rights) calculated by the point calculating process 124 for each call-restricted area (an area in which a call restriction is being carried out). The user ranking DB 125 stores a priority call ranking computed by the priority ranking determining process 126.

In the schedule determining process 127, the processor 1 calculates a number of persons to use priority call rights in each call-restricted area, on the basis of the priority call ranking stored in the user ranking DB 125. Additionally, in the schedule determining process 127, the processor 1 determines an allowed calling time period for each user. Information indicating the number of users and an allowed calling time period for each user in each call-restricted area calculated by the schedule determining process 127 is registered (stored) in the schedule DB 128.

In the allotted time determining process 132, the processor 1 determines a per-user allotted time on the basis of the number of users in each call-restricted area calculated by the schedule determining process 127. The allotted time definition DB 133 stores per-user allotted times. Allotted times may be managed as a list, for example.

In the scheduling delivering process 129, the processor 1 conducts a communication process with the mobile communication network 111, and individually delivers an allowed calling time period (schedule information) established for each user by the schedule determining process 127 to each user's mobile station 117.

<<Base Station>>

Figure 4:
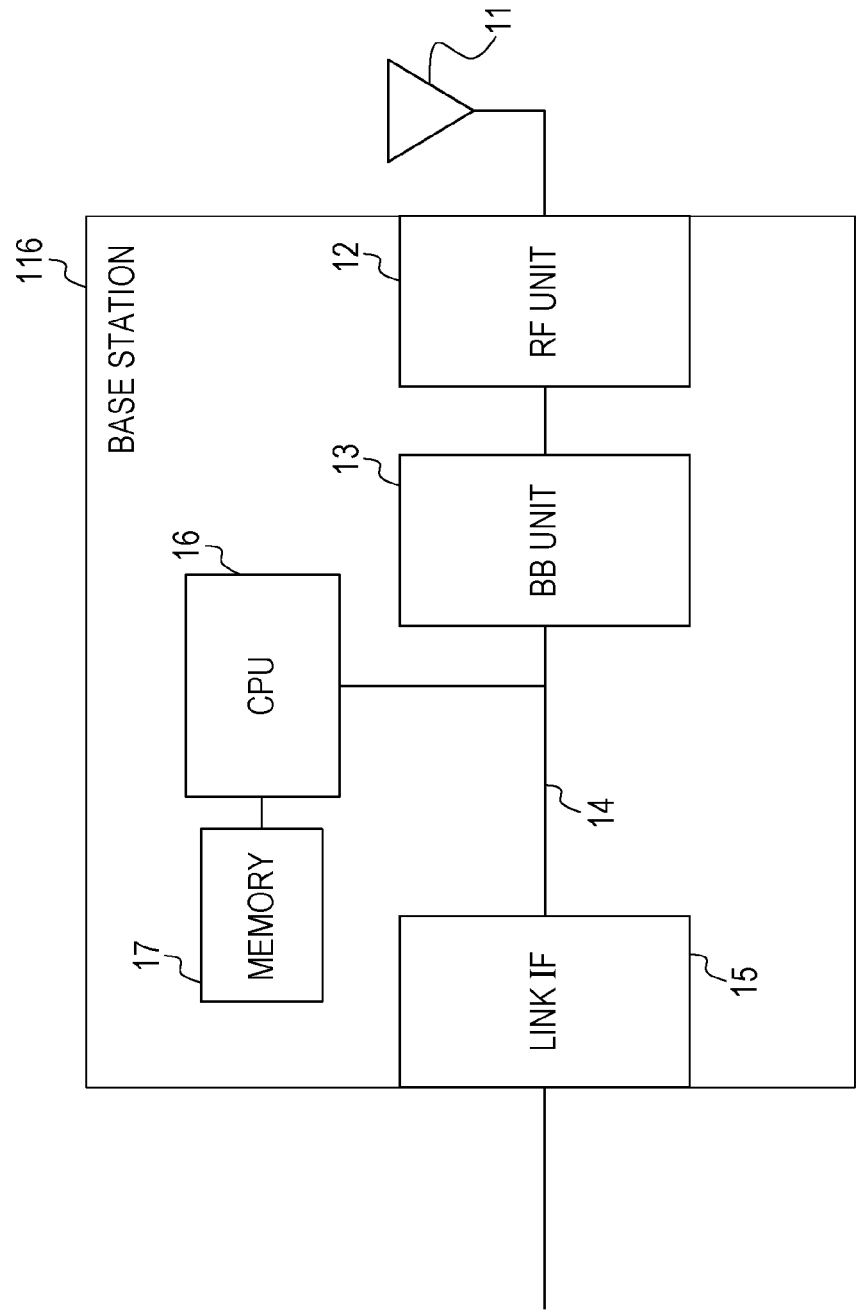
FIG. 4 illustrates an exemplary hardware configuration of a base station.

FIG. 4 illustrates an exemplary hardware configuration of a base station 116. The base station 116 is equipped with an antenna 11, a radio frequency (RF) unit 12, a baseband processor (BB unit) 13 connected to the RF unit 12, a link interface (link IF) 15 and a CPU 16 connected via an internal transmission line 14 (a bus or switch, for example), and memory 17 connected to the CPU 16. The CPU 16 is an example of a processor or controller. The memory 17 may be realized by a non-volatile storage medium and a volatile storage medium, such as ROM and RAM. The memory 17 is an example of a storage device.

The RF unit 12 includes a transmitting subsystem and a receiving subsystem. The receiving subsystem includes electrical or electronic circuits such as an amplifier (a low-noise amp, for example) that amplifies a wireless signal received by the antenna 11, a downconverter that downconverts a wireless signal output from the amplifier, and a demodulator that converts the downconverter output (an analog signal) into a baseband signal. Meanwhile, the transmitting subsystem includes electrical or electronic circuits such as a modulator that converts a baseband signal into an analog signal, an upconverter that converts an analog signal into a radio frequency signal, and an amplifier that amplifies the upconverter output (a power amp, for example).

The baseband unit 13 also includes a transmitting subsystem and a receiving subsystem. The receiving subsystem conducts a channel estimation process, as well as a user data and control data demodulation process and decoding process, on a baseband signal from the RF unit 12. User data obtained by the decoding process is sent to the link IF 15 via the bus 14. Meanwhile, control data obtained by the decoding process is sent to the CPU 16. The transmitting subsystem generates a baseband signal by executing an encoding process, modulation process, and the like on data (user data, control data) received from the link IF 15 and the CPU 16. The baseband signal is sent to the RF unit 12.

The CPU 16, by executing a program stored in the memory 17, executes call control of a mobile station 117 connected to the base station 116, and monitory control (including maintenance) of the base station overall. Furthermore, via call control of a mobile station 117, the base station 116 relays information (data) exchanged between the control system 100 and a mobile station 117. The base station 116 also conducts a call restriction process on mobile stations 117 under supervision. Storage devices such as ROM and RAM are used for the memory 17.

The baseband unit 13 is realizable by having a digital signal processor (DSP) execute a program stored in memory (not illustrated), for example. However, all or part of the processing of the baseband unit 13 may also be realized by wired logic using at least one of an electronic circuit (an LSI or ASIC, for example) and a programmable logic device (PLD) such as a field-programmable gate array (FPGA).

Figure 5:
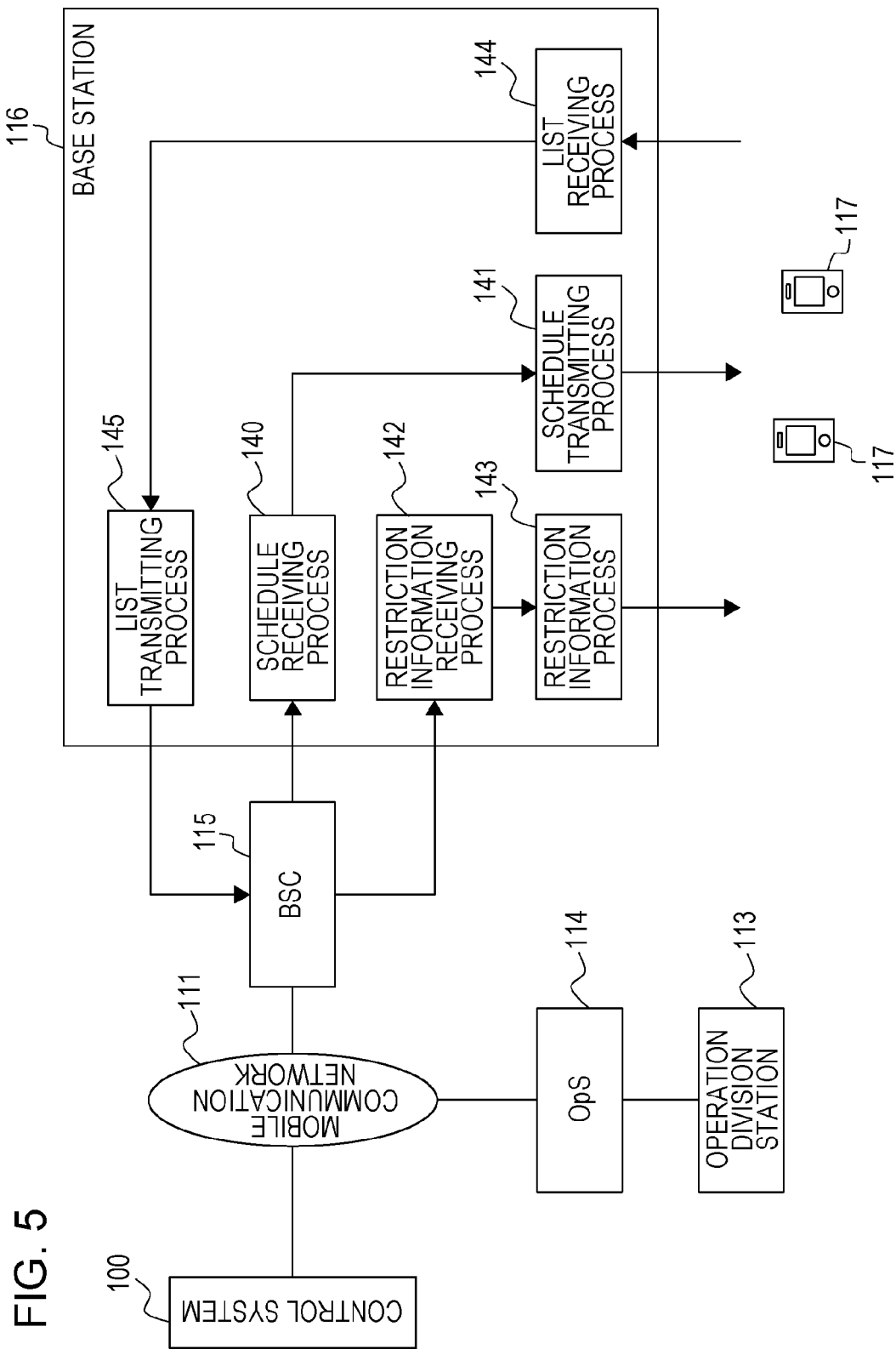
FIG. 5 is a diagram that schematically illustrates functions included in a base station.

FIG. 5 is a diagram that schematically illustrates functions included in a base station 116. The base station 116 executes a list receiving process (priority call information receiving process) 144, a list transmitting process (priority call information transmitting process) 145, a schedule receiving process 140, a schedule transmitting process 141, a restriction information receiving process 142, and a restriction information process 143.

In the list receiving process (priority call information receiving process) 144, a process for receiving priority call information transmitted from a specific mobile station 117 is conducted. In the list transmitting process 145, a process for transmitting priority call information from a specific mobile station 117 to the control system 100 is conducted.

In the schedule receiving process 140, a process for receiving schedule information from the control system 100 via the mobile communication network 111 and a BSC 115 is conducted. In the schedule transmitting process 141, a process for transmitting schedule information to an addressee mobile station 117 is conducted.

In the restriction information receiving process 142, a process for receiving call restriction information (call restriction/restriction release) for the area to which the base station 116 belongs from a BSC 115 is conducted. In the restriction information process 143, a process for generating system information that includes call restriction information received in the restriction information receiving process 142, and transmitting the generated system information to mobile stations 117 under supervision from the antenna 11 is conducted.

The list receiving process 144 is realized by the antenna 11 receiving radio waves that include priority callee information from a mobile station 117. Radio waves including priority callee information received by the antenna 11 are conveyed to the link IF 15 via signal processing by the RF unit 12 and the BB unit 13. The list transmitting process 145 is realized by the link IF 15 sending out priority callee information addressed to the control system 100 in a designated signal format to a BSC 115.

The schedule receiving process 140 is realized by the link IF 15 receiving a signal including schedule information arriving from the control system 100 via the mobile communication network 111 and a BSC 115. Schedule information received by the link IF 15 undergoes signal processing by the internal transmission line 14, the BB unit 13, and the RF unit 12, and is transmitted to a mobile station 117 as radio waves by the schedule transmitting process 141.

Note that within the base station 116, an internal link between a mobile station 117 and the control system 100 are established by call control (a call process) by the CPU 16, with priority callee information and schedule information being transmitted on an internal link.

The restriction information process 143 is a process realized by program execution of the CPU 16, in which the OpS 114 is requested to provide call restriction information at a designated timing (according to a given period or when an event occurs, for example). The link IF 15 generates a control signal that includes a provision request input via the internal transmission line 14, which is transmitted to the OpS 114.

In the OpS 114, the operating station 113 is used to register restriction information that indicates a call restriction/restriction release state (restricted/unrestricted) for each area. The OpS 114 receives a provision request control signal via a BSC 115 and the mobile communication network 111, and in response to the provision request, transmits a control signal including call restriction information addressed to a base station 116. The link IF 15 receives the control signal including call restriction information as part of the restriction information receiving process 142. Call restriction information is supplied to the CPU 16.

The CPU 16 generates system information including call restriction information, which is supplied to the RF unit 12 as part of the restriction information process. The RF unit 12 generates radio waves including the system information, which are transmitted from the antenna 11. At this point, in the case where the call restriction information indicates that call restriction will be carried out in a located area, a call restricting process is executed for mobile stations 117 located in that area. Conversely, in the case where the call restriction information indicates that call restriction will be released in a located area, a call restriction releasing process is executed for mobile stations 117 located in that area.

<<Mobile Station>>

Figure 6:
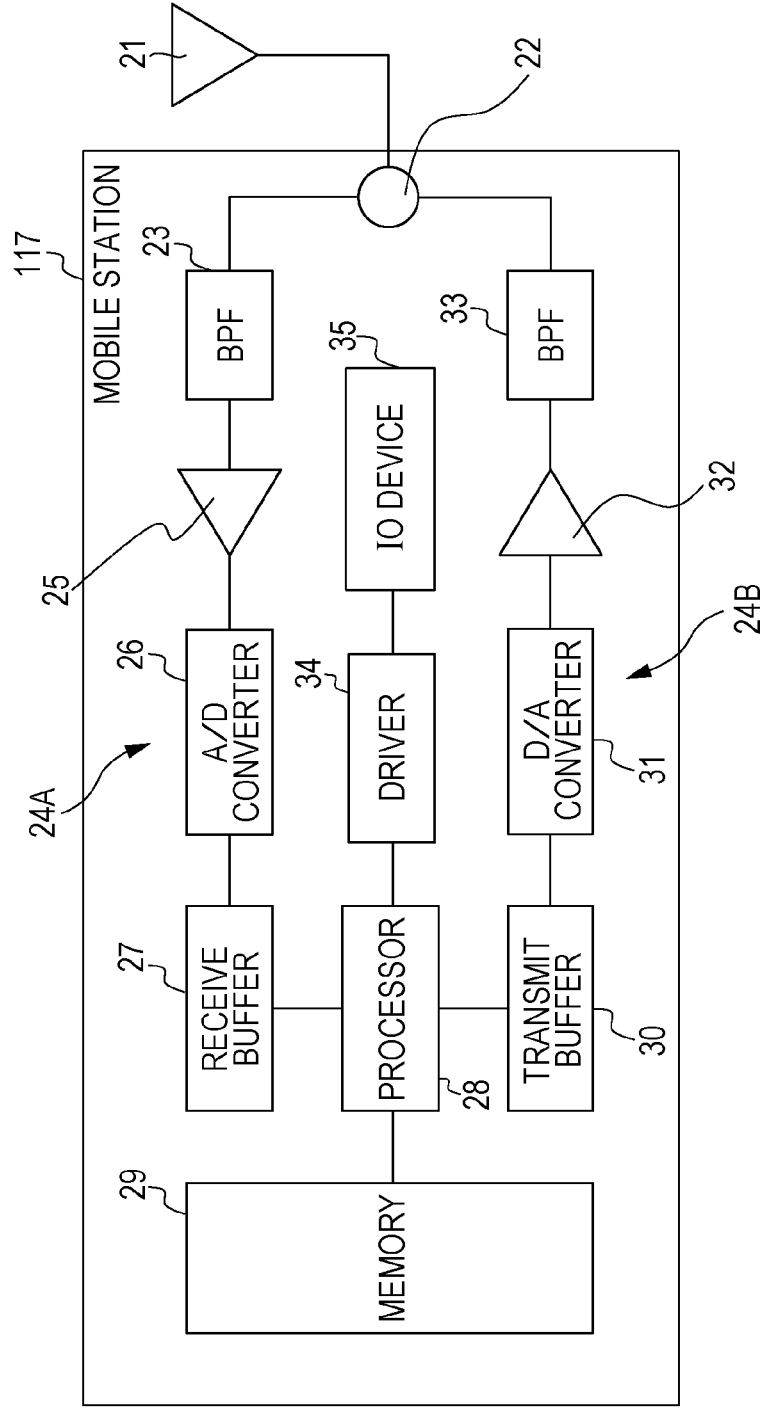
FIG. 6 illustrates an exemplary hardware configuration of a mobile station in an embodiment.

FIG. 6 illustrates an exemplary hardware configuration of a mobile station 117 in an embodiment. In FIG. 6, the mobile station 117 is equipped with a receiving subsystem 24A, a transmitting subsystem 24B, and a control subsystem. The receiving subsystem 24A includes an antenna 21, a circulator 22, a band-pass filter (BPF) 23, a receive amp (Rx amp) 25, an analog-to-digital converter (A/D converter) 26, and a receive buffer 27. The receiving subsystem is an example of a receiver, while the transmitting subsystem is an example of a transmitter.

The transmitting subsystem 24B includes a transmit buffer 30, a digital-to-analog converter (D/A converter) 31, a transmit amp (Tx amp) 32, a BPF 33, the circulator 22, and the antenna 21.

The control subsystem includes a processor 28 and memory 29. The processor 28 is connected to an input/output (IO) device 35 via a device driver (driver) 34. The IO device 35 includes input devices (keys, buttons, and a microphone, for example) as well as output devices (display devices such as a liquid crystal display (LCD), and a speaker).

A wireless signal received by the antenna 21 is input into the BPF 23 via the circulator 22. A frequency band component corresponding to a designated receive frequency is extracted by the BPF 23, and after being amplified by the receive amp 25, is converted into a digital signal by the A/D converter 26. The digital signal is temporarily stored in the receive buffer 27.

The transmit buffer 30 temporarily stores transmit data generated by the processor 28. Transmit data read out from the transmit buffer 30 is converted into an analog signal by the D/A converter 31 and amplified by the transmit amp 32. After that, the resulting signal is transmitted from the antenna (transmit antenna) 21 via the BPF 33 and the circulator 22.

Note that the A/D converter 26, the D/A converter 31, and the driver 34 are realized using an integrated circuit (IC), for example. The receive buffer 27 and the transmit buffer 30 are formed using storage areas in a storage device.

The processor 28 is, for example, a central processing unit (also called a CPU or MPU), a digital signal processor (DSP), or a combination thereof. The memory 29 is an example of a storage device (recording medium), and includes a primary storage device (main memory) and an auxiliary storage device. The main memory includes read-only memory (ROM) and random access memory (RAM). For the auxiliary storage device, at least one from among a hard disk, flash memory, and EEPROM is selected, for example.

The processor 28 conducts various processes and realizes various functions by loading a program stored in auxiliary storage into main memory, and executing the program. For example, the processor 28 acquires desired data by demodulating and decoding digital data stored in the receive buffer 27. Also, the processor 28 generates transmit data by encoding and modulating data to be transmitted, and stores generated transmit data in the transmit buffer 30.

Also, the processor 28 conducts a process depending on an input signal, via interpretation of a signal input by an input device included in the IO device 35. The processor 28 also uses the memory 29 to create display data for a display, and controls the displaying of display data by the display.

The processor 28 also conducts a telephony-related voice process. Also, the processor 28 executes, by program execution, a telephony call/disconnect process and control related to call restriction.

Figure 7:
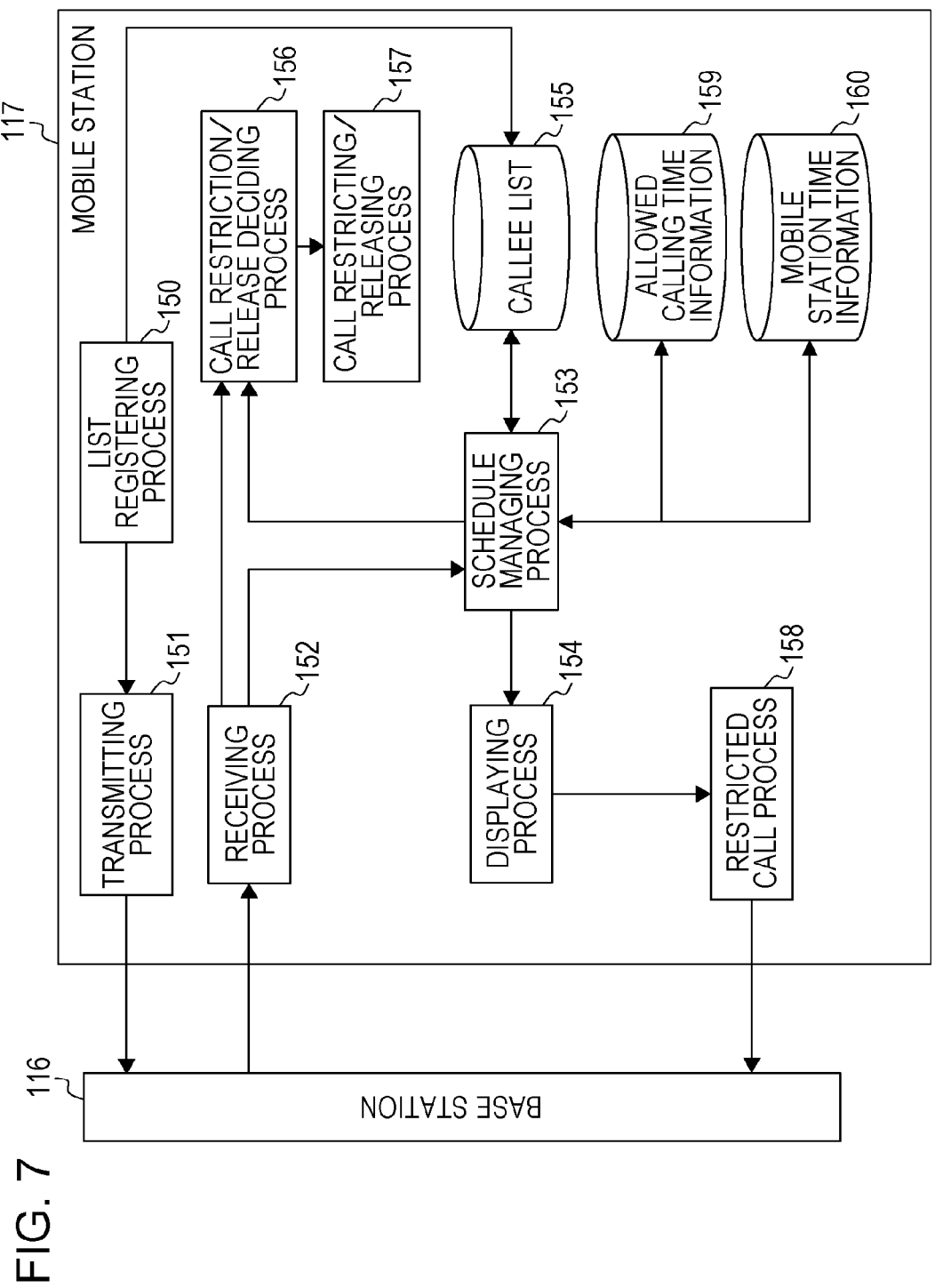
FIG. 7 is a diagram that schematically illustrates functions of a mobile station.

FIG. 7 is a diagram that schematically illustrates functions of a mobile station 117. The mobile station 117 executes, by program execution, a list registering process 150, a transmitting process 151, a receiving process 152, a schedule managing process 153, and a displaying process 154. Also, the processor 28 executes, by program execution, a call restriction/release deciding process 156, a call restricting/releasing process 157, and a restricted call process 158. The memory 29 of the mobile station 117 also stores a callee list 155, allowed calling time information 159, and mobile station time information 160.

In the list registering process 150, the processor 28 assists in creating and registering priority callee information desired by the user during a call restriction, or in other words, a priority callee list. In other words, the processor 28 provides the user with a user interface (UI) for creating a priority callee list, accepts one or more priority callees input using an input device included in the IO device 35, and generates a priority callee list. The priority callee list may be stored in the memory 29. In the transmitting process 151, the processor 28 conducts a process for generating a signal (a list registration request message) including a priority callee list (priority callee information), and transmitting the signal from the antenna 21, for example.

In the receiving process 152, the processor 28 conducts a process of receiving schedule information (which indicates an allowed calling time period for that mobile station 117) from the control system 100 received by the antenna 21. Received schedule information is stored in the callee list 155, for example. The schedule managing process 153 conducts various processes for controlling a call to a priority callee during the schedule (allowed calling time period).

A start time and an end time of an allowed calling time period included in the schedule information are stored in the memory 29 as allowed calling time information 159. The mobile station 117 is equipped with an internal clock (not illustrated), and the current time measured by the clock is treated as mobile station time information 160.

In the call restriction/release deciding process 156, the processor 28 makes a call restriction/release decision based on the result of a reconciliation between allowed calling time information 159 (start time, end time) based on schedule information, and mobile station time information 160 (current time). In other words, the processor 28 determines whether or not the current time is in the allowed calling time period, and decides to release the call restriction if in the allowed calling time period, and enforce the call restriction if not in the allowed calling time period. In the call restricting/releasing process 157, the processor 28 executes a call restricting process or a call restriction releasing processor according to the decision result of the call restriction/release deciding process 156.

In the displaying process 154, the processor 28 conducts a process for displaying various information, such as an allowed calling time period and a priority callee list, on a display included in the IO device 35. In the restricted call process 158, the processor 28 executes a calling process in an allowed calling time period.

<<OpS>>

Figure 8:
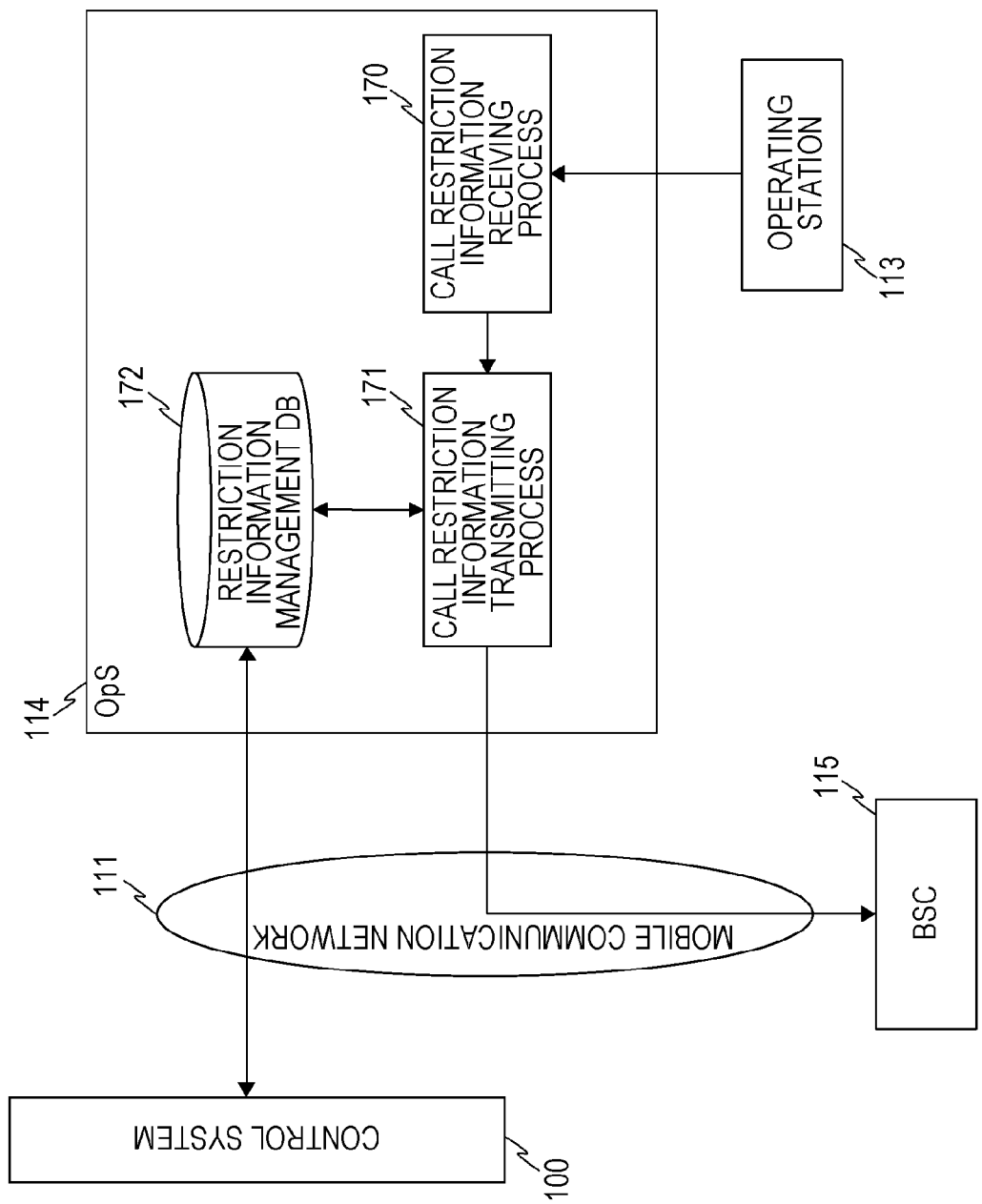
FIG. 8 is a diagram that schematically illustrates functions of an OpS.

FIG. 8 is a diagram that schematically illustrates functions of an OpS 114. Hardware-wise, the OpS 114 is equipped with, for example, a configuration that includes the information processing device 100A illustrated in FIG. 2, or in other words a processor 1, memory 2, an HD (HDD) 3, an IO device 4, and a communication IF 5. The OpS 114 is able to communicate with respective BSCs 115 and the control system 100 (information processing device 100A) via a network (the mobile communication network 111).

By having the processor 1 execute a program stored in the memory 2, the OpS 114 is able to execute a call restriction information receiving process 170 and a call restriction information transmitting process 171, and function as a device equipped with a restriction information management database (restriction information management DB) 172 that stores call restriction information.

In the call restriction information receiving process 170, the processor 1 uses the communication IF 5 to communicate with the operating station 113 via a network, and receives call restriction information for each area of the mobile communication network 111 transmitted from the operating station 113. Call restriction information is stored in the restriction information management DB 172. The restriction information management DB 172 is stored in a storage device such as the memory 2 or HD 3 provided in the OpS 114.

In the call restriction information transmitting process 171, the processor 1 provides call restriction information according to a request for call restriction information from the control system 100 received by the communication IF 5. Call restriction information is transmitted from the communication IF 5 and received at the control system 100 via the mobile communication network 111. Also, the processor 1 of the OpS 114 transmits call restriction information to a base station 116 via a BSC 115 according to an operation at the operating station 113 (an call restriction enforcement/call restriction release operation).

According to the OpS 114, by transmitting call restriction information (call restriction/restriction release information) to a BSC 115 when enforcing a call restriction or releasing a call restriction in an area, it is possible to enforce a call restriction or release a call restriction with respect to base stations 116 under the supervision of that BSC 115.

<Exemplary Operations>

<<Overview of Operations>>

Figure 9:
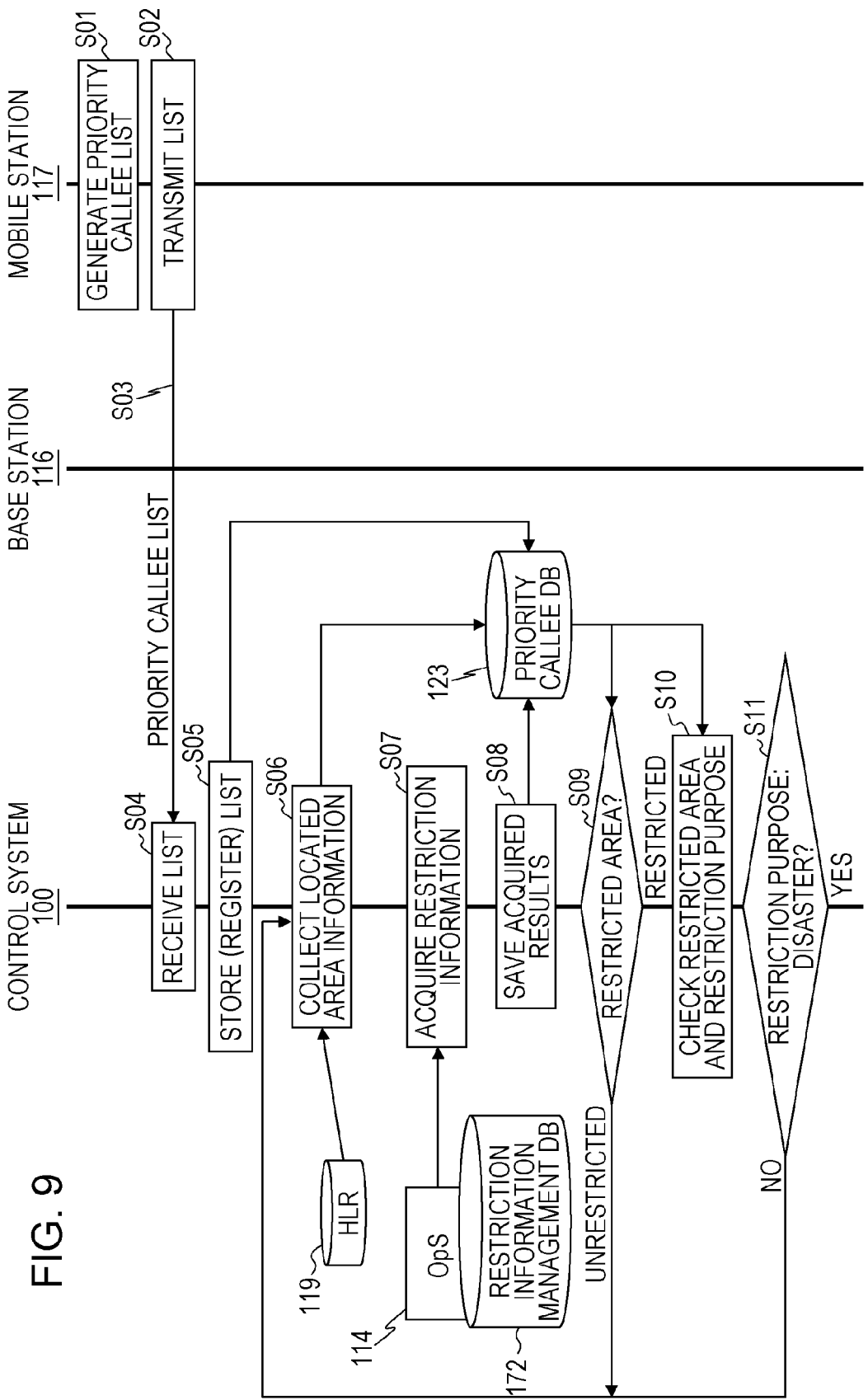
FIG. 9 is a sequence diagram explaining exemplary operations according to an embodiment, and illustrating operations such as priority callee registration in a control system and call restriction decision.

Next, exemplary operations regarding a call restriction in the present embodiment will be described. FIGS. 9 to 14 are sequence diagrams explaining exemplary operations according to an embodiment. In FIG. 9, the user of a mobile station 117 registers a priority callee list in the control system 100 in advance, in preparation for a call restriction enforced by a telecommunication operator. The call restriction is enforced as a result of a disaster (such as an earthquake or fire) or an event.

In other words, the processor 28 of the mobile station 117, under control by the IO device 35, provides a priority callee list creation environment (user interface) to the user. The user uses the creation environment to input information related to one or more priority callees.

The processor 28 uses the input priority callee information to generate a priority callee list (S01). The priority callee list includes information on one or more priority callees (name, phone number, priority ranking (a priority ranking on the list; a list ranking)) in association with identification information for the mobile station 117.

Subsequently, the processor 28 conducts a process of transmitting the priority callee list (hereinafter also simply designated the "list") to the control system 100 (S02). Thus, the list reaches the control system 100 via a base station 116 (BSC 115, mobile communication network 111) (S03). In the control system 100, the processor 1 executes the list receiving process 120, receives the list received from the mobile station 117 (S04), and stores (registers) the list in the priority callee DB 123 (S05).

After that, in the control system 100 (information processing device 100A), the processor 1 executes the located area information collecting process 121 periodically, for example (S06). In other words, the processor 1 references the priority callee DB 123, acquires located area information for stations on the list (the caller station (mobile station 117), as well as all priority callee stations (mobile stations 117, landline stations 118, PHS stations 118A)) from the HLR 119 or the like (PSTN, PHS network), and stores the acquired located area information in the priority callee DB 123.

Subsequently, the control system 100 (processor 1) executes the restriction information acquiring process 122 (S07). In other words, the processor 1 accesses the restriction information management DB 172 of the OpS 114, acquires call restriction information for each area, and stores the acquired call restriction information in the priority callee DB 123 (S08). The call restriction information for each area may include a call restriction flag and a restriction purpose for an area. The restriction purpose may include "disaster" or "event", for example.

Next, the control system 100 (processor 1) uses the list, the located area information, and the call restriction information stored in the priority callee DB 123 to determine whether or not there is a call restriction in the located areas of the caller station and a callee station (S09). At this point, in the case where there is no call restriction in the located areas for all stations (S09; unrestricted), no particular processing is conducted, and the process enters a standby state until the start timing of the next located area information collecting process 121 (S06).

In contrast, in the case where a call restriction is being enforced in the respective located areas of the caller station and a callee station (a located area is a restricted area) (S09; restricted), a process of determining a calling schedule for the located area of the caller station (that is, the mobile station 117) is executed.

In other words, the processor 1 references the priority callee DB 123 and checks the restricted area (the located area of the mobile station 117) and the restriction purpose (S10). The processor 1 then determines whether or not the restriction purpose is "disaster" (S11).

At this point, if the restriction purpose is "event", the process is returned to S06 (standby until the next located area information collection timing). In contrast, if the restriction purpose is "disaster", a process for computing an allowed calling time is conducted for mobile stations 117 in the restricted area that have registered a priority callee list in the control system 100 (hereinafter also designated "registered stations").

Note that in the following description, the term "restricted area" refers to an area in which a call restriction is enforced due to a restriction purpose of "disaster", and does not include an area in which a call restriction is enforced due to an "event". It is also possible to omit the processes of storing the restriction purpose and determining whether or not the restriction purpose is a disaster, by obtaining only information on restricted areas whose restriction purpose is a disaster as the call restriction information acquired from the OpS 114.

For example, in the case where a call restriction is enforced in the area A (FIG. 1) due to a disaster occurring, a telecommunication operator may operate the operating station 113 and input call restriction information for the area A into the OpS 114. Subsequently, the OpS 114 transmits call restriction instructions, which are one type of control instructions, to all base stations 116 belonging to the area A. The call restriction instructions include a designated restriction rate.

Figure 10:
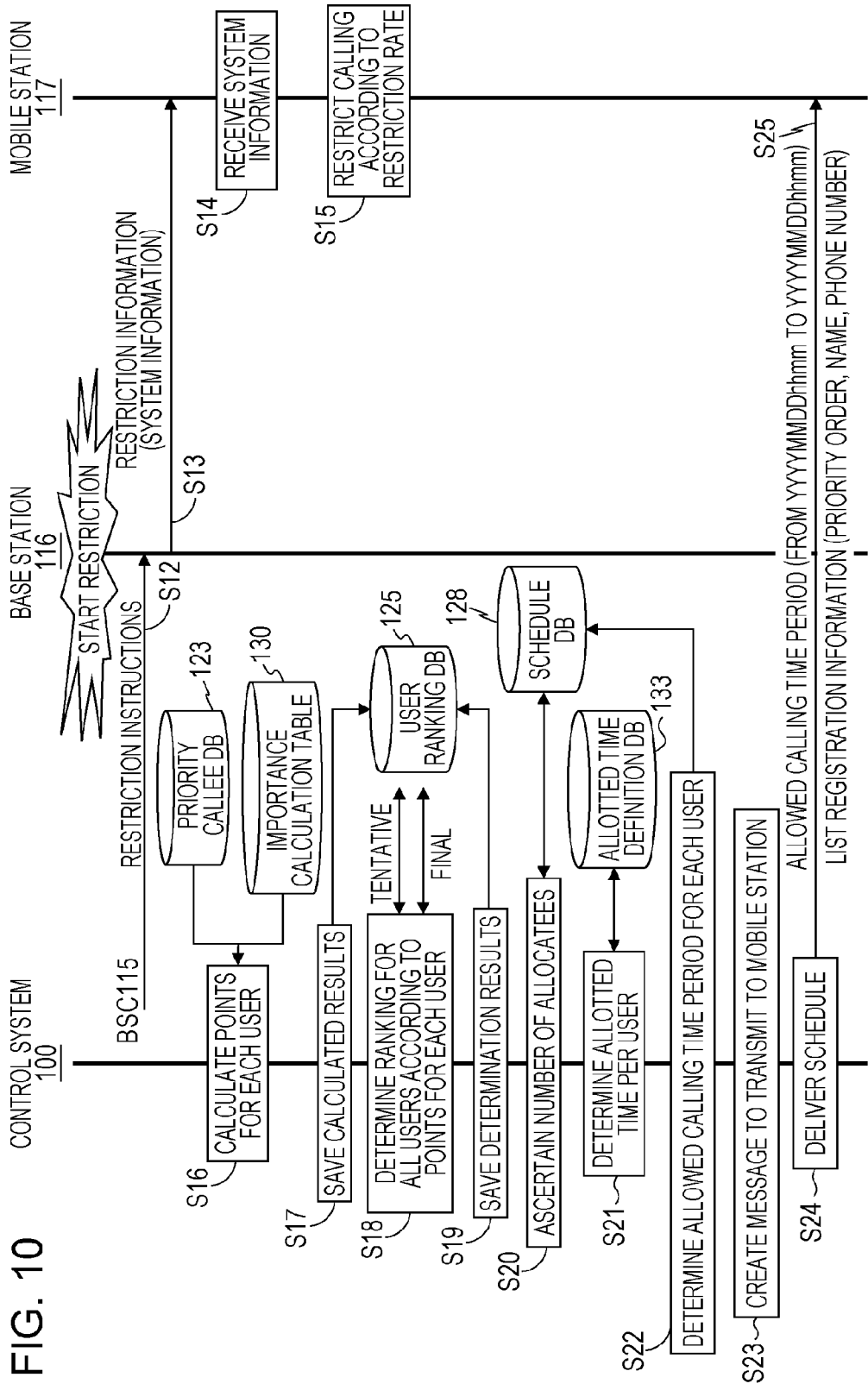
FIG. 10 is a sequence diagram explaining exemplary operations according to an embodiment, and illustrating operations by which a control system determines and announces an allowed calling time period for registered stations in a restricted area.

As illustrated in FIG. 10, each base station 116 in the area A (exemplified as just one in FIGS. 10 to 13) receives call restriction instructions via a BSC 115 (S12). The base station 116 generates system information including the restriction information (information indicating call restriction enforcement and a restriction rate) included in the call restriction instructions, and transmits the system information to mobile stations 117 under supervision (S13). Thus, each mobile station 117 located in the area A is able to receive system information that includes restriction information.

Each mobile station 117 (exemplified as just one in FIGS. 10 to 13), upon receiving system information (S14), restricts calling in accordance with the restriction rate in the restriction information included in the system information (S15). In other words, the mobile station 117 switches to a first call restriction mode. In the first call restriction mode, the mobile station 117 enters a state of accepting a user's call operations within a scope corresponding to the restriction rate, with the exception of calling special numbers (such as emergency numbers like "110", "118", and "119", for example).

For example, if a restriction is enforced, the call success probability decreases according to the restriction rate. For example, a restriction rate of 80% yields a state in which one call in five will connect (a success probability of 20%). As a specific restriction method, the lengths of a disallowed calling time and an allowed calling time within a time length of a designated period (one cycle time) may be varied according to the restriction rate. In the case of no restriction, the disallowed calling time in one cycle time is 0, while the allowed calling time equals one cycle time (100%). In contrast, as the restriction rate increases to 20%, 50%, and 80%, for example, the allowed calling time in one cycle time shortens to $4/5$, $1/2$, and $1/5$. As a result, calls become more difficult to connect as the restriction rate increases.

Alternatively, a call restriction may be achieved by decreasing the number of links in some cases. For example, the number of usable links is decreased according to the restriction rate (%) with respect to the total number of usable links in the case of no restriction as a basis of reference. For example, the number of usable links in the case of a restriction rate of 80% becomes $1/5$ of the above total number of links. As a result, calls become more difficult to connect. The call restriction method in the first call restriction mode is arbitrary.

Meanwhile, if the restriction purpose is determined to be "disaster" in S11 of FIG. 9, the control system 100 conducts the following process. Herein, a summary of the process will be given, and details of the process will be discussed later. The control system 100 determines a ranking of allowed calling time periods for all mobile stations 117 located in a restricted area A, from among the users of mobile stations 117 registered in the priority callee DB 123 (registered stations). For this reason, the control system 100 calculates points for each user of a registered station on the basis of the importance calculation table 130 (S16). Point calculation results are stored in the user ranking DB 125 (S17).

Next, on the basis of the points for each user stored in the user ranking DB 125, the control system 100 determines a ranking of all users of registered stations located in the restricted area (area A) (S18). The determined ranking is stored in the user ranking DB 125 (S19).

When a ranking is determined, the control system 100 computes the number of users to which to allocate an allowed calling time period in the restricted area (area A) (S20). The control system 100 stores the computed number of users in the schedule DB 128. When the number of users is computed, the control system 100 determines an allotted time per user by referencing the allotted time definition DB 133 (S21).

When an allotted time per user is determined, the control system 100 determines an allowed calling time period for each user (S22). Determined allowed calling time periods are stored in the schedule DB 128. After determining allowed calling time periods, the control system 100 creates, for each user (registered station), a message that includes the allowed calling time period for that user (a message to be transmitted to a mobile station) as schedule information (S23). Subsequently, the control system 100 delivers the messages for users to corresponding mobile stations 117 (S24). At this point, a priority callee list (list registration information) received from a registered station may be included together with the schedule information.

Figure 11:
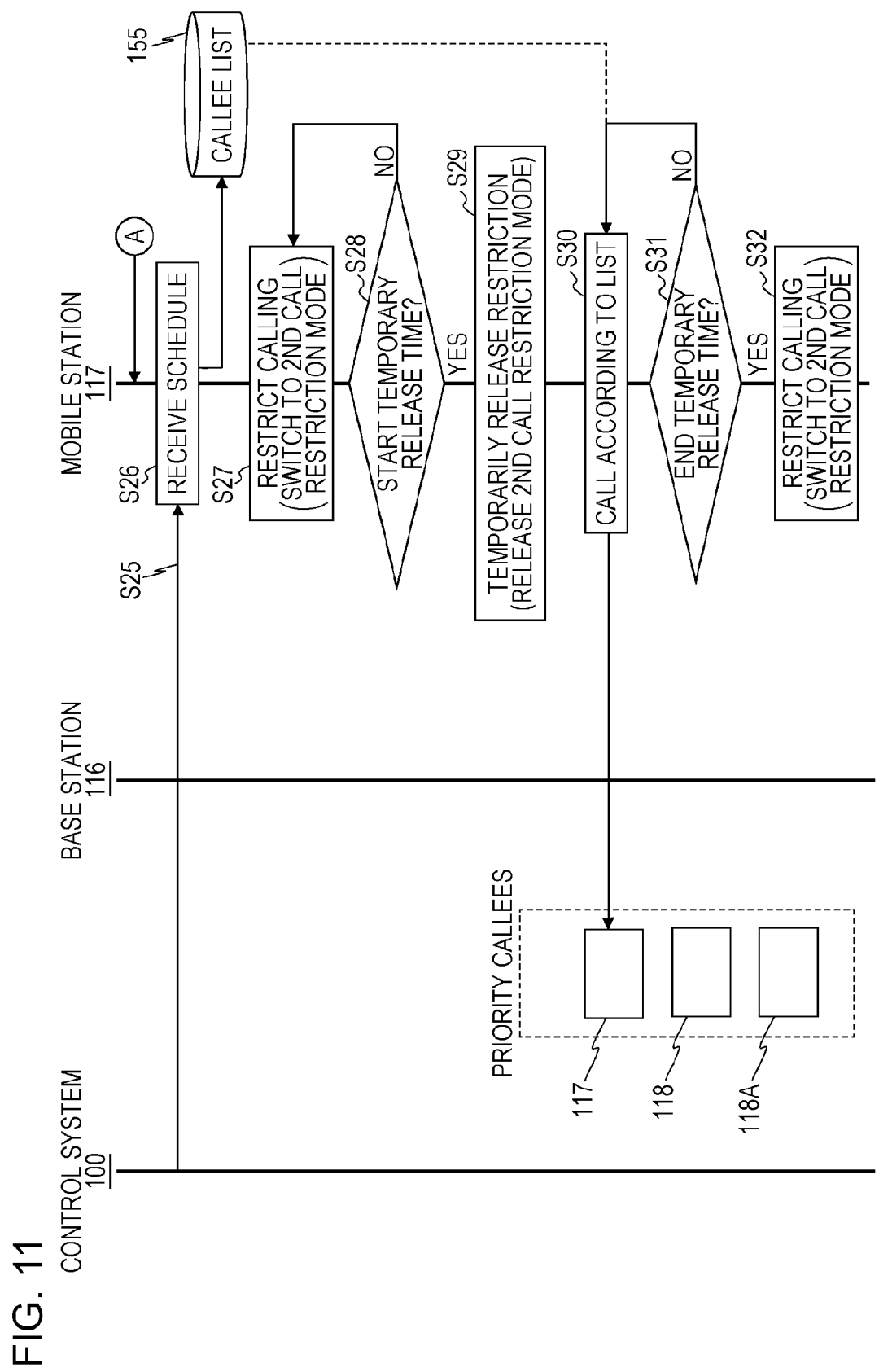
FIG. 11 is a sequence diagram explaining exemplary operations according to an embodiment, and illustrating operations by which a mobile station calls a priority callee in an allowed calling time period.

As illustrated in FIG. 11, upon receiving schedule information from the control system 100 via a base station 116 (S25), a mobile station 117 (registered station) registers the schedule information in the callee list 155 (S26). Subsequently, the registered station switches to a second call restriction mode (S27). In the second call restriction mode, the registered station enters a state that only allows calls to priority callees on a priority callee list in an allowed calling time period reported by the control system 100, with the exception of emergency calling (calling special numbers such as "110", "118", and "119"). In other words, in the second call restriction mode, only calls to special numbers and "ordinary numbers" (that is, phone numbers other than the special numbers) that are on the priority callee list are allowed inside the allowed calling time period, whereas only calls to special numbers are allowed outside the allowed calling time period.

The registered station waits until the start time of the allowed calling time period in the schedule information stored in the callee list 155, and when the start time is reached (S28; Yes), temporarily releases the call restriction (S29). Thus, inside the allowed calling time period, the user of the registered station is able to call and conduct telephony with mobile stations 117, landline stations 118, and PHS stations 118A that correspond to priority callees included on the priority callee list (S30). After that, when the end time of the allowed calling time period is reached (S31; Yes), the control system 100 again enters a state enforcing the call restriction (S32).

In the process up to this point, the acquisition of located area information (S06) and the acquisition of restriction information (S07) are executed with respect to all areas of the mobile communication network 111, but may also be executed for individual areas, or for individual area groups obtained by dividing the entire area into a designated number of area groups. Also, the order of acquisition of located area information and restriction information may also be reversed. Also, the processing in S16 to S24 in FIG. 10 may also be sequentially carried out for each area, while the respective processing for point calculation, user ranking determination, user number ascertaining, allotted time determination, and message creation may be executed in parallel with respect to all restricted areas (restriction purpose: "disaster").

Figure 12:
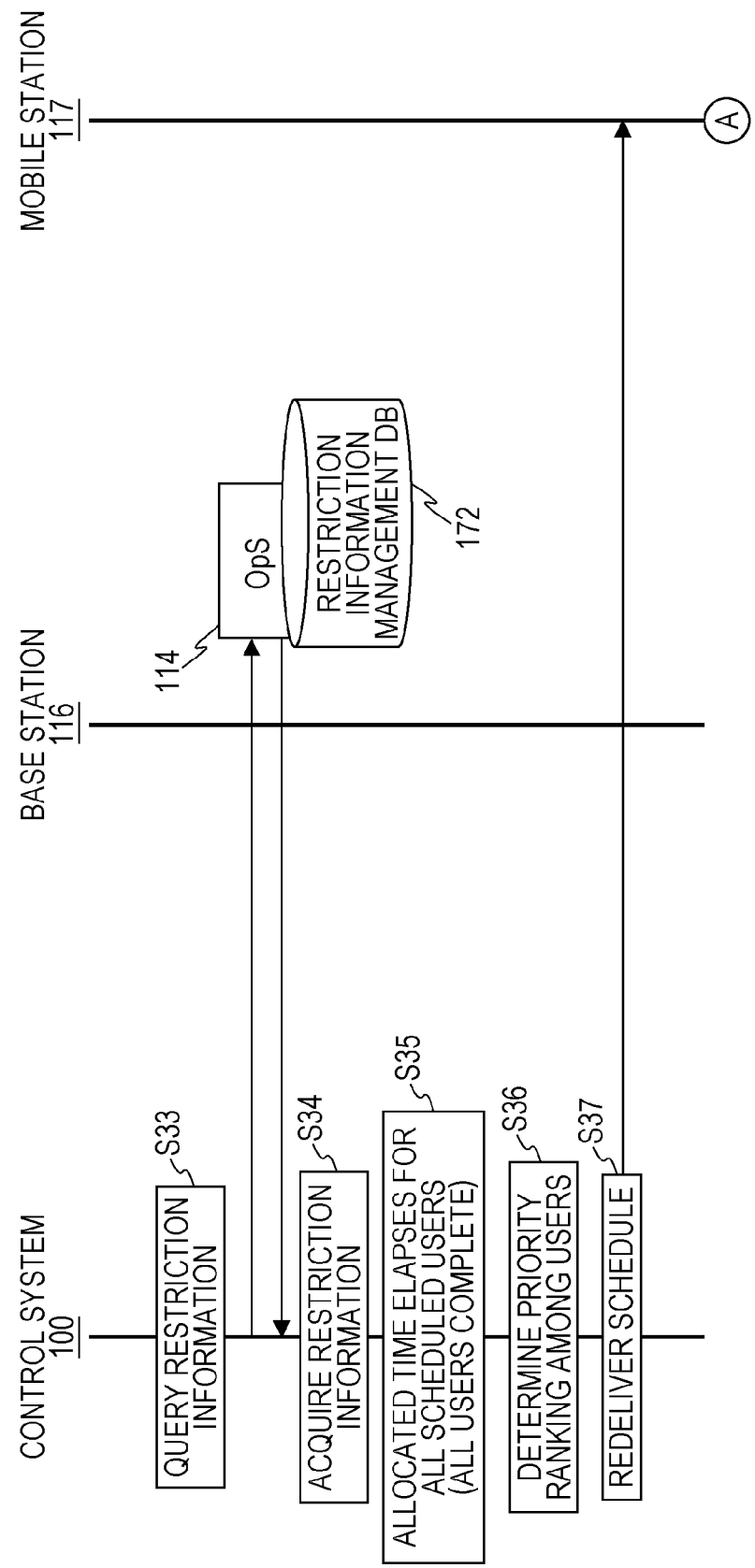
FIG. 12 is a sequence diagram explaining exemplary operations according to an embodiment, and illustrating operations for the case where a call restriction is ongoing.

FIG. 12 illustrates a sequence for the case in which a call restriction is ongoing. The control system 100 queries for periodic restriction information regarding a restricted area (restriction purpose: "disaster") (S33), and acquires call restriction information stored in the restriction information management DB 172 of the OpS 114 (S34).

The control system 100, by referencing the acquired restriction information, determines whether the restriction is ongoing or released. If, as a result of the determination, there exists an area whose call restriction due to a disaster is ongoing (for example, a restriction on area A is ongoing), the following process is conducted for the relevant area whose call restriction is ongoing. Namely, the control system 100 waits for the allocated time for all users set for that area to elapse (S35), and when the allocated time elapses, conducts scheduling again (S36).

In other words, the control system 100 again conducts the processing from S06 to S24 illustrated in FIGS. 9 and 10 (S35, S36, and S37 in FIG. 12). Thus, a registered station in a restricted area (area A) due to a disaster again conducts the processing from S26 to S32 illustrated in FIG. 11. Consequently, a registered station is able to call (conduct telephony with) priority callees inside a re-allocated allowed calling time period.

Figure 13:
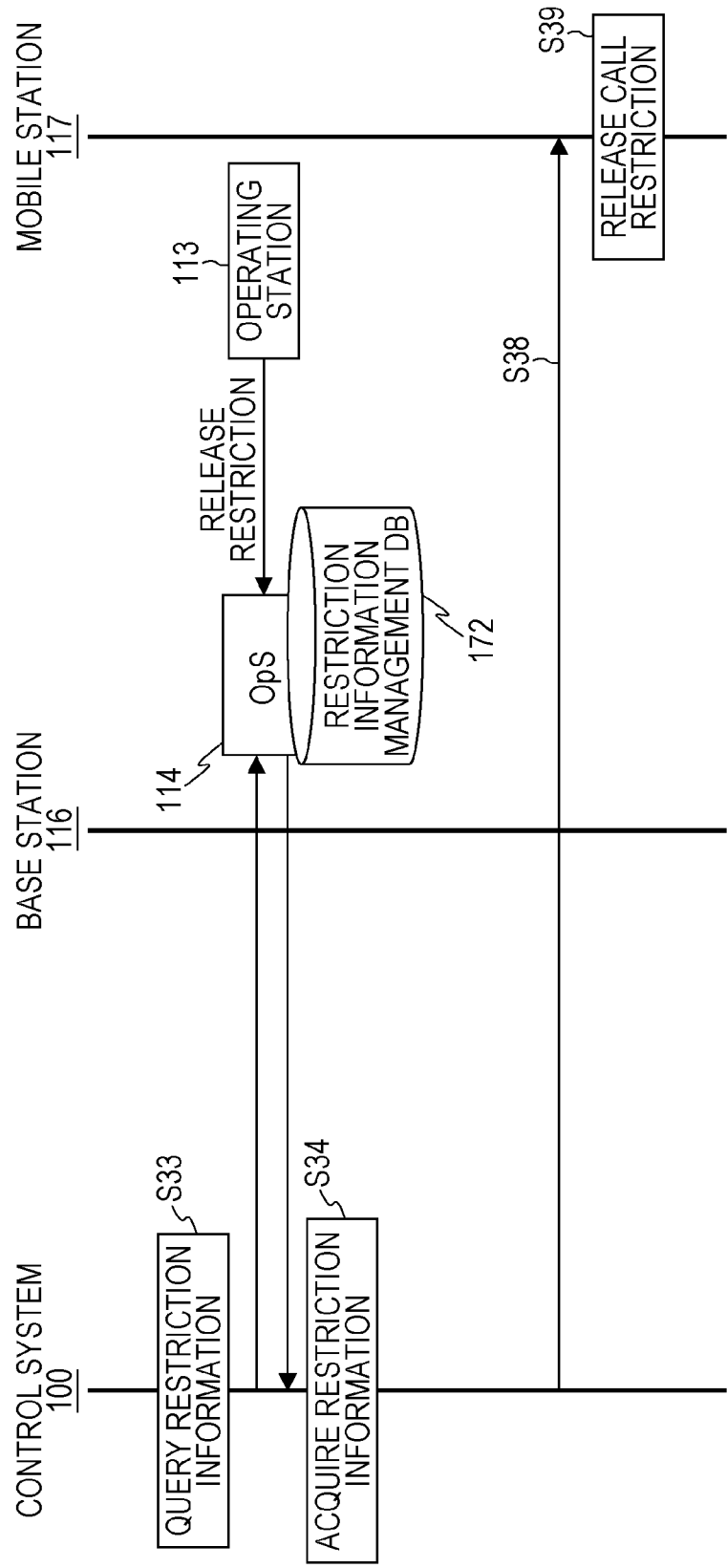
FIG. 13 is a sequence diagram explaining exemplary operations according to an embodiment, and illustrating operations for the case where a call restriction is released.

FIG. 13 illustrates a sequence when a restriction is released. As above, the control system 100 periodically accesses the restriction information management DB 172 of the OpS 114 for a restricted area (S33), and acquires call restriction information stored in the restriction information management DB 172 (S34). However, in the case where the operating station 113 has registered a call restriction release for the restricted area (area A) in the restriction information management DB 172, in S34 the control system 100 acquires information indicating a call restriction release for the area A.

The control system 100, by referencing the restriction information acquired this time, determines whether the restriction is ongoing or released. In the case where there exists an area whose restriction is determined to be released (area A, for example), the control system 100 transmits, via base stations 116, call restriction information indicating a restriction release to each registered station (mobile station 117) in the area A (S38).

A registered station (mobile station 117), upon determining from the call restriction information that the call restriction for the area A has been released, switches from the second call restriction mode to a normal mode (S39). Thus, the registered station enters a state allowing calls irrespective of the callee in the area A (normal operation).

Figure 14:
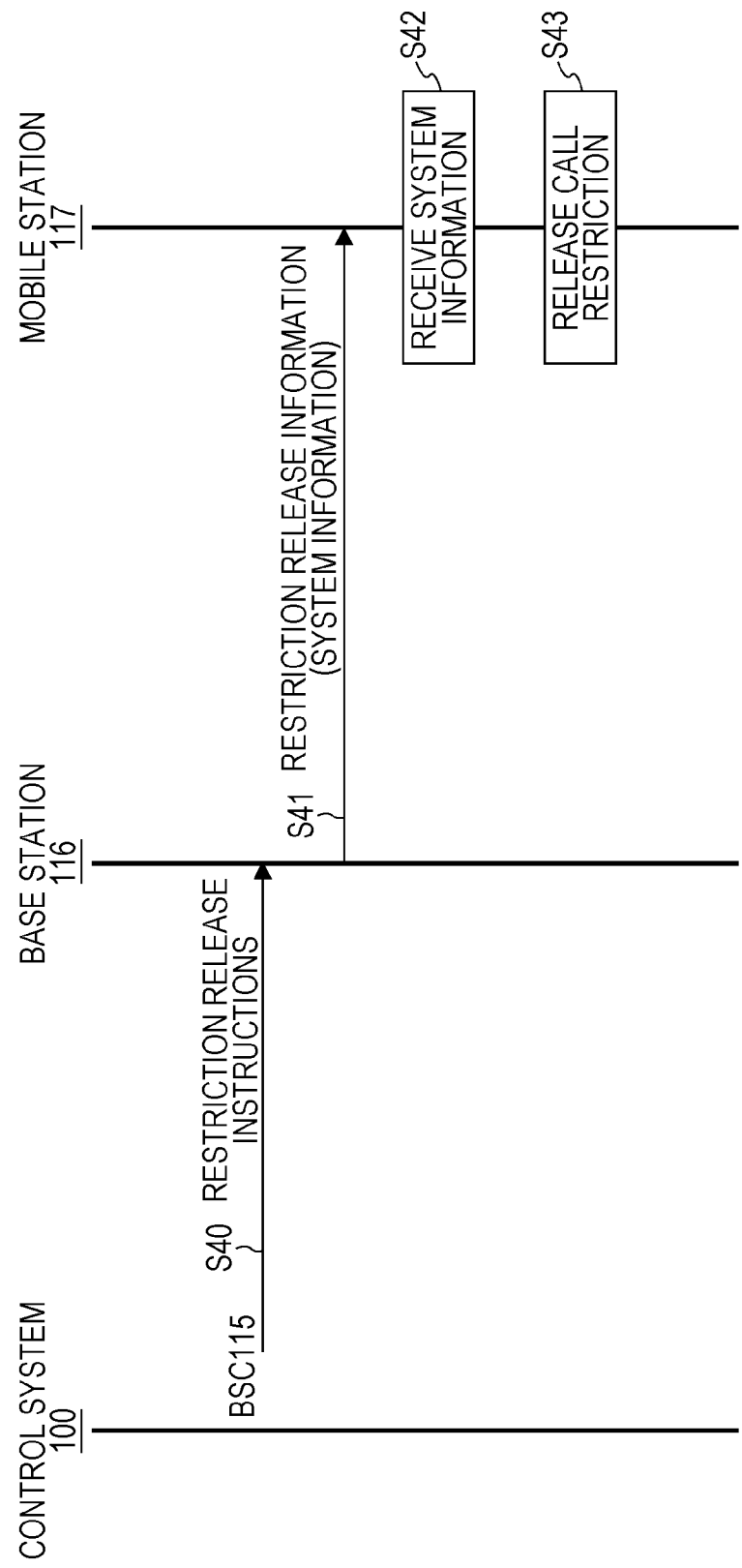
FIG. 14 is a sequence diagram explaining exemplary operations according to an embodiment, and illustrating operations for the case where a mobile station moves from a restricted area to an unrestricted area.

FIG. 14 illustrates a sequence for the case in which a mobile station 117 (registered station: second call restriction mode) located in a restricted area (area A, for example) moves to an unrestricted area (area B, for example). In the unrestricted area (area B), a base station 116 receives information indicating that there is no call restriction (in the example in FIG. 14, restriction release instructions) from a higher-tier BSC 115 (S40).

The base station 116, on the basis of the restriction release instructions, generates system information including information indicating that there is no call restriction (restriction release information), and transmits the generated system information to the cell of the base station 116 (S41). The registered station, by moving into the area B, receives the system information including restriction release information from the base station 116 (S42). Subsequently, the registered station releases the second call restriction mode, and switches to normal mode (S43).

<<Detailed Operations>>

Hereinafter, operations (processing) of a control system 100, base station 116, and mobile station 117 (registered station) illustrated in the overview will be described in detail.

<<Operations of Mobile Station During List Registration>>

Stored in the memory 29 of the mobile station 117 (FIG. 6) is an application program for making use of the second call restriction mode discussed above, or in other words, a service that enables calls to priority callees inside an allowed calling time period determined by the control system 100. Hereinafter, such an application program will be designated the "call guarantee app", and the service provided by the call guarantee app will be designated the "call guarantee service".

The processor 28 of the mobile station 117, by executing the call guarantee app, conducts processes such as the list registering process 150, the transmitting process 151, the receiving process 152, the schedule managing process 153, the displaying process 154, and the restricted call process 158 as illustrated in FIG. 7.

Figure 15:
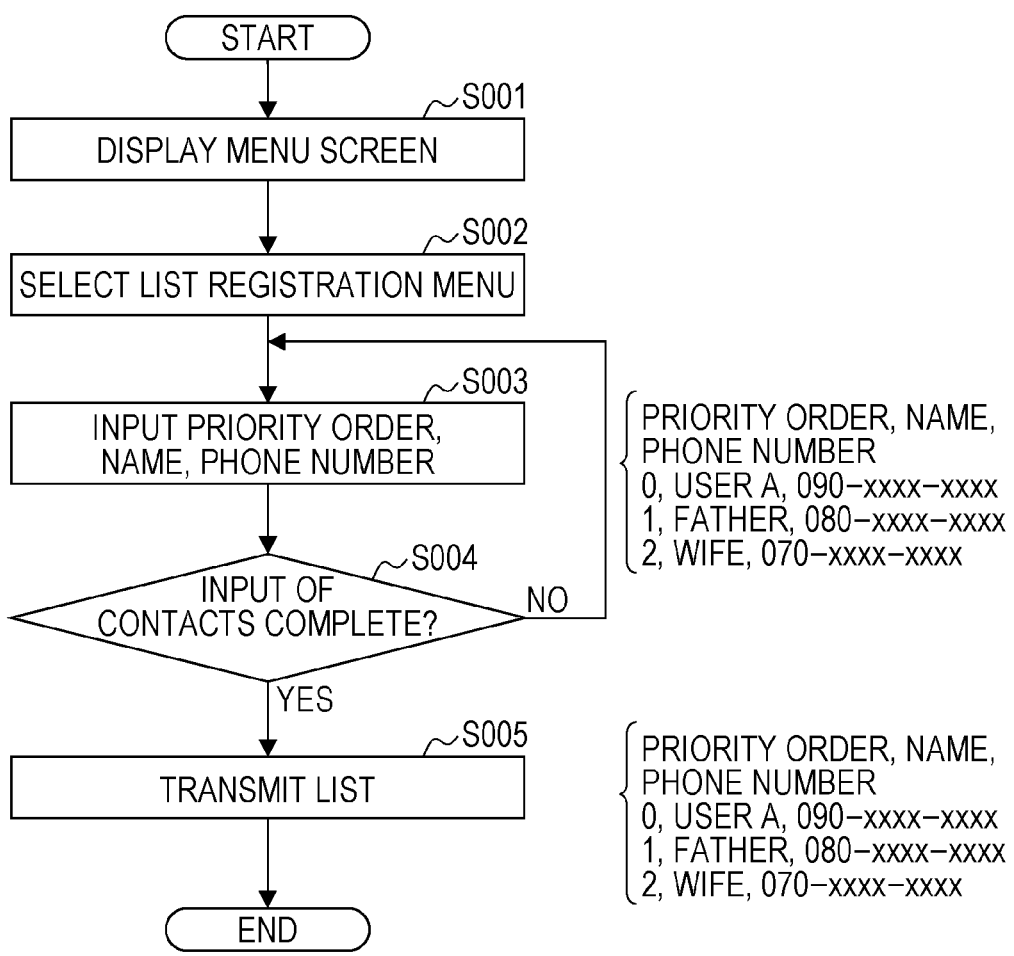
FIG. 15 is a flowchart illustrating details of a list registering process.

FIG. 15 is a flowchart illustrating details of the list registering process 150. The list registering process 150 is started in the case where the processor 28 (FIG. 6) activates (starts executing) the call guarantee app due to an operation on the mobile station 117 by a user A, for example.

When the list registering process 150 starts, first, the processor 28 displays a menu screen of the call guarantee app (not illustrated) on a display included in the IO device 35 (S001). Next, upon accepting the selection of a list registration menu item according to an operation by the user A (S002), the processor 28 provides a priority callee list creation environment (user interface: UI) (S003).

In other words, the processor 28 causes a display to display an input screen for a priority ranking (list ranking), name, and phone number as priority callee (contact) information, and accepts a priority ranking, name, and phone number input from an input device. At this point, the processor 28 is able to accept multiple priority callees. An upper limit on the number of priority callees may be set.

For example, as illustrated in FIG. 15, the name of the user of the mobile station 117 (user A) and the phone number of the mobile station 117 are input as priority ranking "0". Also, the names and phone numbers of a father and wife are input as priority callees (contacts).

The processor 28, upon accepting input indicating the completion of contacts input (S004; Yes), executes a process of transmitting a registration request message including information on the user A and one or more priority callees input up to this point, or in other words a priority callee list, to the control system 100 (S005). Note that the address of the control system 100 is stored in the memory 29 in advance, for example. The processor 28 stores the priority callee list in the callee list 155.

The above illustrates an example of providing a UI for list creation and transmission with the call guarantee app. However, a modification like the following is possible. In other words, the control system 100 may function as a web server that provides a website for list registration. A mobile station 117 accesses the website using a website address (URL) stored in the memory 29. The website then provides a UI for list registration to the mobile station 117. The UI is displayed on a display by a web browser included in the mobile station 117. The user uses the UI to input a priority callee list, and upon inputting completion, the priority callee list is transmitted to the control system 100. In this case, the mobile station 117 may not include UI data in advance.

<<<Operations of List Receiving Control System Prior to Disaster>>>

Figure 16:
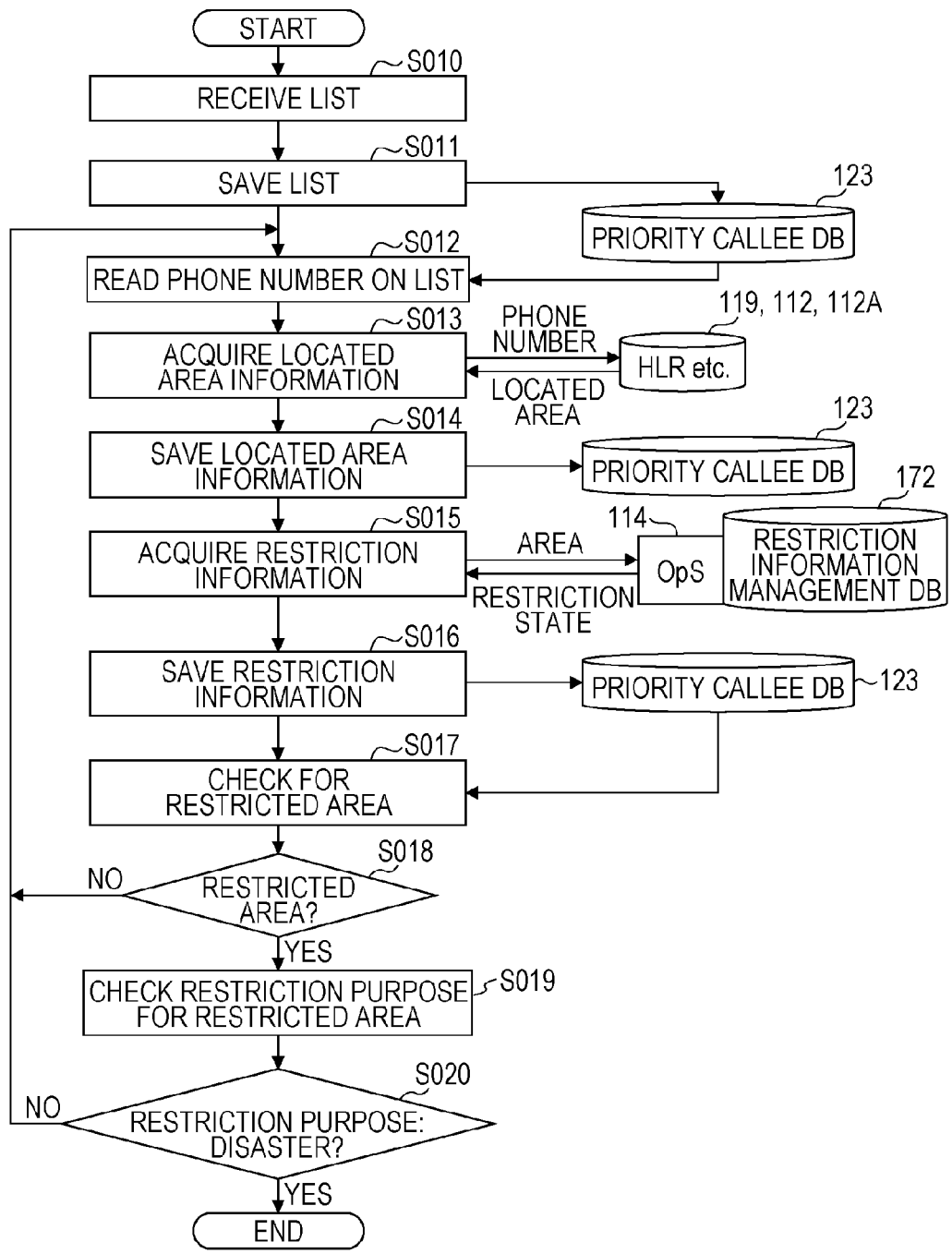
FIG. 16 is a flowchart illustrating exemplary operations of a control system when receiving a list prior to a call restriction.

FIG. 16 is a flowchart illustrating operations of a control system when receiving a list prior to a call restriction. The process in FIG. 16 is started as a result of receiving a priority callee list from a mobile station 117, for example. The processor 1 of the control system 100 executes the list receiving process 120 (FIG. 3), receives a priority callee registration list from the mobile station 117 (S010), and stores the list in the priority callee DB 123 (S011).

FIG. 17 is an exemplary illustration of a user A's priority callee list registered in the priority callee DB 123. As illustrated in FIG. 17, priority rankings (list rankings), names, and phone numbers forming the list are respectively stored. By such registration in the priority callee DB 123, the user A's mobile station 117 is thereafter treated as a registered station for the call guarantee service.

Next, the processor 1 conducts the located area information collecting process 121. In other words, the processor 1 retrieves the phone numbers of the user A and each priority callee stored in the priority callee DB 123 (S012), and queries any of the HLR 119 (mobile communication network), the PSTN 112, and the PHS network 112A for located area information for each phone number. By querying, information indicating the located area of the station possessing each phone number is acquired as located area information (S013). The processor 1 stores acquired located area information in the priority callee DB 123 (S014). FIG. 18 is an exemplary illustration of a state in which located area information (the service area) is additionally stored in the priority callee list illustrated in FIG. 17.

Subsequently, the processor 1 executes the restriction information acquiring process 122. In other words, the processor 1 queries the OpS 114 for the state of call restriction with respect to the located areas registered in the priority callee list, and in response, receives call restriction information for each located area (S015).

FIG. 19 is an exemplary illustration of stored content in the restriction information management DB 172 of the OpS 114. The restriction information management DB 172 stores a restriction state and a restriction reason corresponding to each area of the mobile communication network 111. The restriction state is "restricted" or "unrestricted", while the restriction reason is "disaster" or "event", for example. However, the number of types of restriction reasons and restriction states is not limited to the above example. Also, the content illustrated in FIG. 19 is an exemplary illustration, and does not match the content illustrated in FIG. 20 below.

Call restriction information includes information indicating whether or not an area is restricted, as well as the restriction purpose during a restriction. The processor 1 stores call restriction information in the priority callee DB 123 (S016). FIG. 20 is an exemplary illustration of a state in which call restriction information is additionally stored in the priority callee list illustrated in FIG. 18.

Next, the processor 1 executes the information managing process 131. In other words, the processor 1 references the priority callee list and checks whether or not a restricted area exists (S017). At this point, the process returns to S012 if a restricted area does not exist (S018; No). In contrast, if a restricted area does exist (S018; Yes), the processor 1 checks the restriction purpose of the restricted area (S019), and determines whether or not the restriction purpose of the restricted area is "disaster" (S020).

At this point, if the restriction purposes of the restricted areas are all "event", the process returns to S012. In contrast, if there exists a restricted area with a restriction purpose of disaster, the process illustrated in FIG. 16 ends, and proceeds to a process for call restriction with respect to the restricted area of the disaster. In the example illustrated in FIG. 20, an area "Shinjuku" is restricted with the restriction purpose "disaster". For this reason, the process switches to a process for carrying out a call restricting process (call restriction according to the second call restriction mode) targeting mobile stations 117 (registered stations) located in the area "Shinjuku".

The processing in S010 and S011 (list receiving process 120) in the process illustrated in FIG. 16 is executed when called every time a priority callee list registration request arrives from a mobile station 117. In contrast, the processing in S012 (located area information collecting process 121) and thereafter of FIG. 16 is periodically executed at a designated period. Registered stations at the start time of the located area information collecting process 121 become the recipients of the call guarantee service. Note that the processing in S012 and thereafter may also be configured to start executing in the case where special execution instructions are input.

<<<Operations of Base Station when Call Restriction Starts>>>

Figure 21:
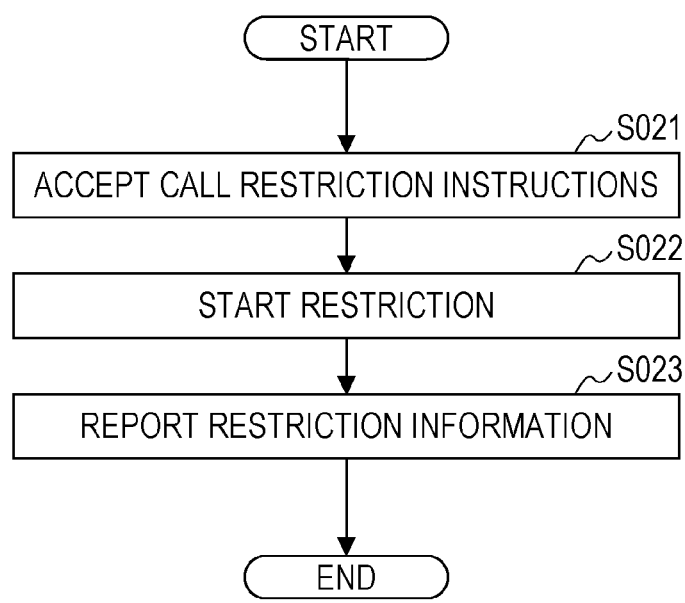
FIG. 21 is a flowchart illustrating exemplary operations of a base station when a call restriction starts.

FIG. 21 is a flowchart illustrating exemplary operations of a base station 116 when a call restriction starts. A base station 116 in an area in which a call restriction has started receives call restriction instructions from the OpS 114 via a BSC 115. The CPU 16 (FIG. 4) of the base station 116 accepts the call restriction instructions with the restriction information receiving process 142 (FIG. 5) (S021). Subsequently, the CPU 16 generates system information that includes restriction information (including a restriction rate) with the restriction information process 143 (FIG. 5) (S022), and by transmitting the system information, reports the call restriction information to mobile stations 117 under supervision (S023). Thus, a first call restriction (call restriction due to the first call restriction mode) is started in a mobile station 117.

<<<Operations of Control System after Call Restriction Starts>>>

Figure 22:
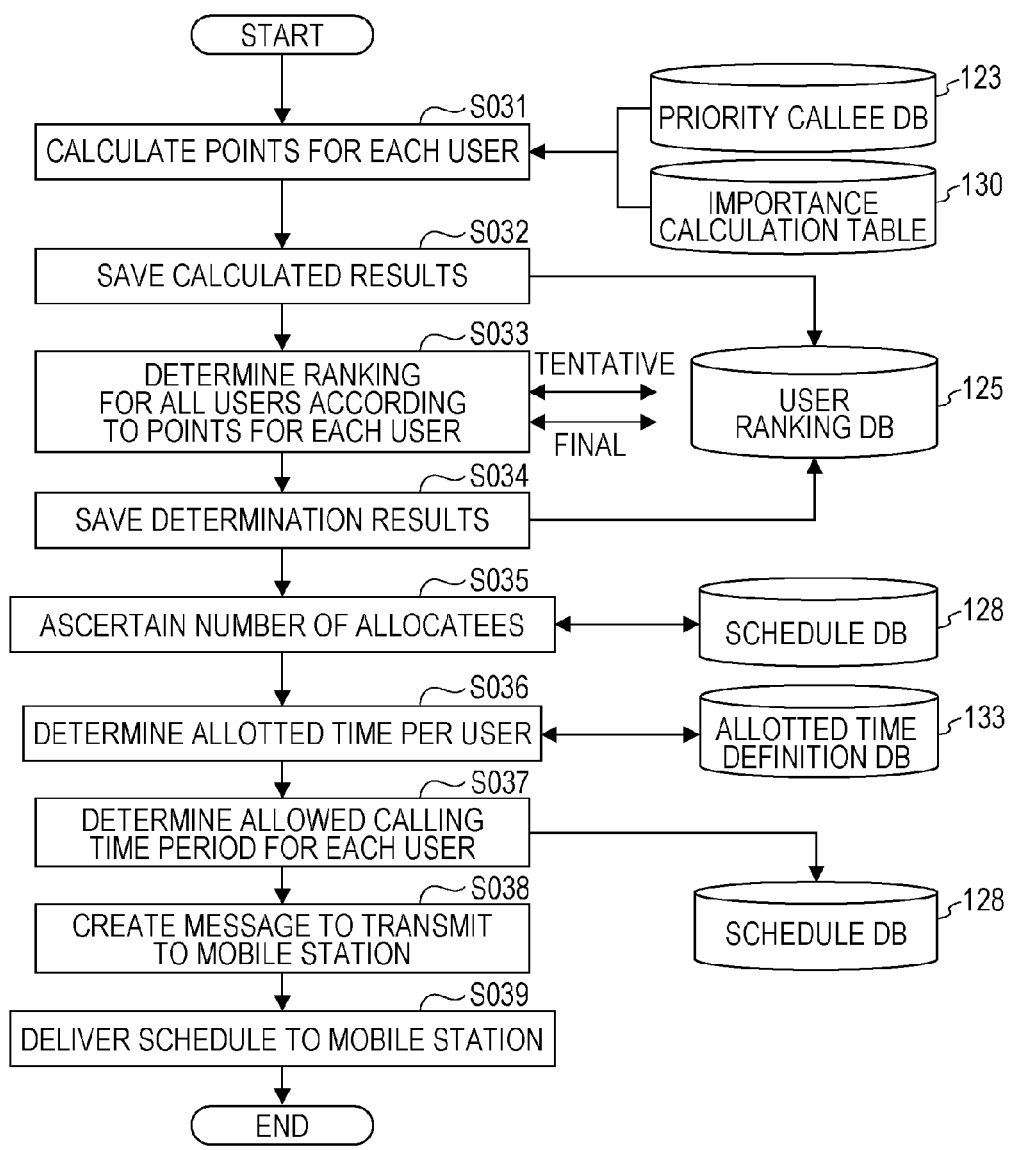
FIG. 22 is a flowchart illustrating exemplary operations of a control system after a call restriction starts.

FIG. 22 is a flowchart illustrating exemplary operations of a control system 100 after a call restriction starts. The process illustrated in FIG. 22 starts when triggered by a Yes determination in S020 illustrated in FIG. 16, or in other words, the enforcement of a call restriction in a given area due to a disaster, or in other words the detection of a restricted area. Each registered station located in a given restricted area corresponds to a restricted station.

In FIG. 22, the processor 1 of the control system 100 conducts the point calculating process 124. In other words, the processor 1 calculates points to be used as a basis for determining an allocation ranking of allowed calling time periods for mobile stations 117 (registered stations) located in that restricted area (S031). Point calculation is conducted using the information stored in the priority callee DB 123, and the importance calculation table 130. The processor 1 stores point calculation results in the user ranking DB 125 (S032).

Subsequently, the processor 1 executes the priority ranking determining process 126. In other words, on the basis of the points for each user, the processor 1 determines a priority ranking for the allocation of allowed calling time periods with respect to all users (restricted stations) in each restricted area (S033). The processor 1 stores the determined priority ranking for allowed calling time period allocation in each restricted area in the user ranking DB 125 (S034).

FIGS. 23 to 28 illustrate examples of stored content in the priority callee lists of users A to F, which are being stored in the priority callee DB 123 at the start time of the process in FIG. 22. As illustrated in FIGS. 23 to 28, the process illustrated in FIG. 16 yields a state in which the located area of a station possessing a phone number, the restriction state of the located area, and the restriction reason are stored in association with the phone number of a caller or callee for the users A to F. Note that the stored content in FIGS. 23 to 28 is an exemplary illustration, and differs from the example illustrated in FIGS. 17, 18, and 20. The number of users (users A to F) is an exemplary illustration.

FIG. 29 illustrates an exemplary data structure of the importance calculation table 130. The importance calculation table 130 is used to calculate importance by weighting restriction state patterns of caller and callee located areas. In the importance calculation table 130, an importance is stored with respect to the combination of the caller restriction state and the callee restriction state. In the example in FIG. 29, importance "1" is the highest, and importance "2" is lower than importance "1". Importance "0" is treated as unimportant (lowest).

Importance "1" is set in the case where both the caller and the callee are restricted due to a disaster. Also, importance "2" is set in the case where the caller is restricted due to a disaster, but the callee is either unrestricted or restricted due to an event. Other cases are set to importance "0".

The processor 1 references each user's priority callee list and the importance calculation table 130, and calculates an importance for each callee of each user. The importance calculation results are stored in the priority callee list of the priority callee DB 123. FIGS. 30 to 35 illustrate examples in which the results of an importance calculating process executed for users A to F are stored in a list.

The importance calculating process is executed with respect to a restricted station, or in other words a registered station (user) located in a restricted area, for example. However, the importance calculating process may also be executed on all priority callee lists (all users) in the priority callee DB 123. Although the examples in FIGS. 30 to 35 illustrate examples in which importance calculation results are stored for all users A to F, in the case of processing stations located in a restricted area (restricted stations), the importance calculating process is executed for the users A to D.

<<<Point Calculating Process>>>

Figure 36:
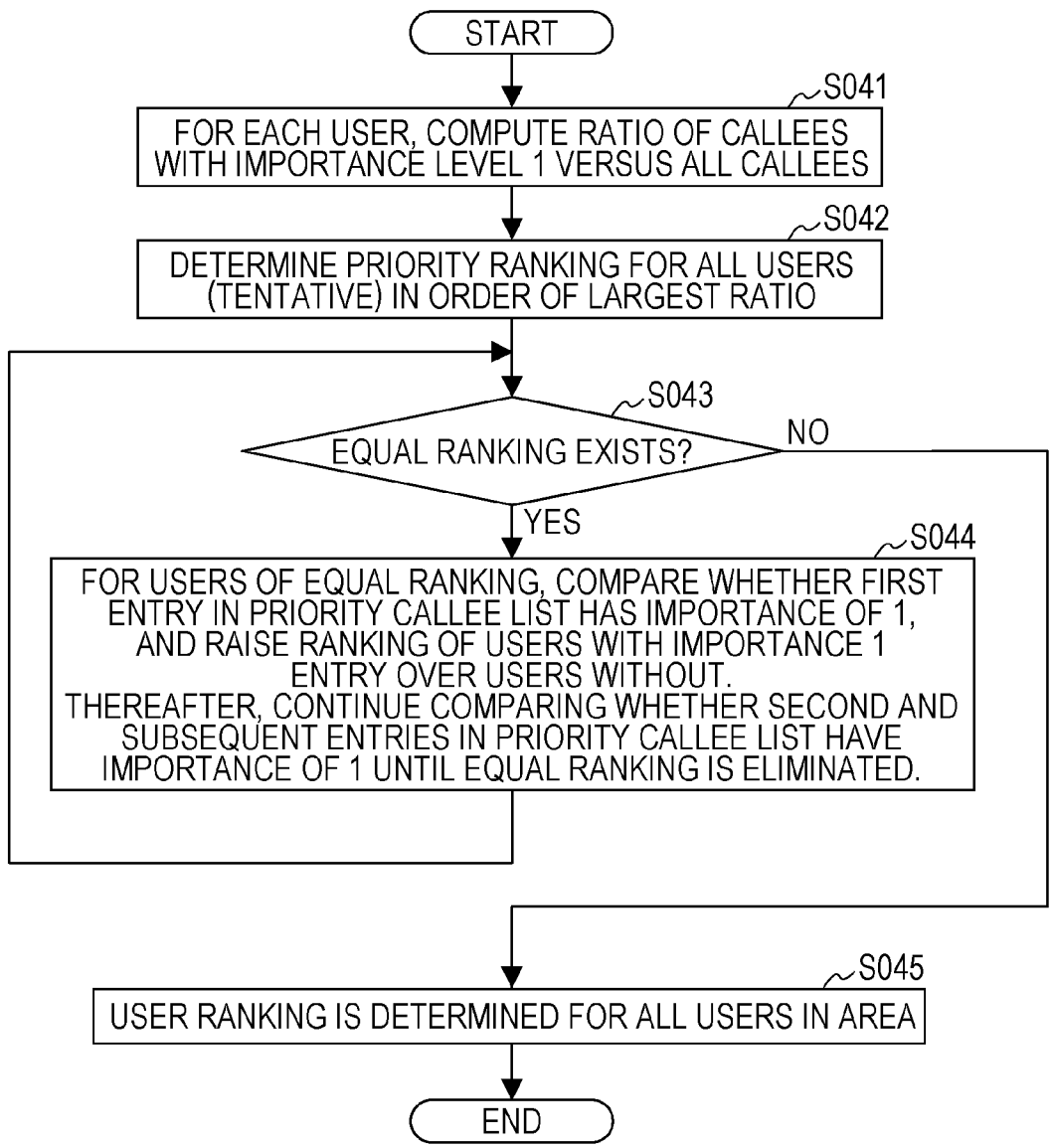
FIG. 36 is a flowchart illustrating exemplary details of a point calculating process and a priority ranking determining process.

FIG. 36 is a flowchart illustrating details of the point calculating process 124 (S031 in FIG. 22) and the priority ranking determining process 126 (S033 in FIG. 22). The process illustrated in FIG. 36 is executed by the processor 1 following the importance calculating process described above. The point calculating process 124 is executed for each restricted area. The description of the point calculating process 124 below assumes that users A to D are located in a given restricted area, irrespective of the stored content in FIGS. 30 to 35.

First, the processor 1 respectively computes the ratio of callees with importance "1" versus all priority callees for each of all users (users A to D) within a restricted area (S041). Provided that N is defined to be a user located in a given restricted area, $t_N$ is the number of callees registered in that user's priority callee list, and $i_N$ is the number of callees with importance 1, the proportion $p_N$ of importance 1 for a user N is computed with the following Eq. 1.

$$p_N = i_N / t_N \qquad \text{Eq. 1}$$

The processor 1 computes the proportion $p_N$ for each of the users A to D, and stores the calculated results in the user ranking DB 125 (FIG. 3). FIG. 37 illustrates stored content in a work table stored in the user ranking DB 125. As illustrated in FIG. 37, assume that "2/4", "3/4", "2/4", and "1/4" are respectively obtained as the point (proportion $p_N$) calculation results for the users A to D.

Subsequently, the processor 1 determines a priority ranking for a tentative allocation of allowed calling time periods to all users, in order of the largest point (proportion) value (S042). At this point, users having the same value are given the same priority ranking. Consequently, the tentative priority ranking of the users A to D becomes "2", "1", "2", and "4". The tentative priority ranking is stored in the user ranking DB 125 (see FIG. 37).

Next, the processor 1 determines whether or not an equal ranking exists in the tentative priority ranking (S043). If an equal ranking does not exist, the processor 1 confirms the tentative priority ranking as the final ranking without change (S045). In contrast, in the case where an equal priority ranking does exist, the processor 1 determines a priority ranking among users with the same priority ranking (S044).

In other words, for users with the same priority ranking (user A and user C), the processor 1 determines whether the callee with a ranking (list ranking) of 1 on the priority callee list has importance "1". At this point, if one user's importance is "1", and another user's importance is "none", the processor 1 raises the priority ranking of the one user over the other (lowers the priority ranking of the other). In contrast, in the case where both are importance "1", or importance "none", the processor 1 conducts a similar process on the importance of the callee with the next priority ranking (list ranking 2). In so doing, a high priority ranking is given to a user with a high priority ranking of callees with importance "1". The loop processing in S043 and S044 is repeatedly executed until there are no more users of equal ranking, and when there are no more users of equal ranking, the process proceeds to S045, and a priority ranking for the allocation of allowed calling time periods to all users is finalized. The processor 1 stores the priority ranking in the user ranking DB 125.

FIG. 38 is an explanatory diagram for the process S043 and S044 (ranking determining process for users of equal ranking). As above, if there is no equal ranking in the point calculation results illustrated in FIG. 37, the priority ranking becomes final. However, the user A and the user C are of equal ranking. For this reason, according to the process in S044, the priority ranking is raised for the user with importance 1 higher on the list.

Specifically, the importance is compared for the first callees from the tops of the lists (priority ranking 1) for the users A and C, and if importance "1" is set for only the callee of one user, the priority ranking of the one user is lowered below the other user. However, if the importance of the callees with priority ranking 1 is both "1" for the users A and C, the above process is conducted on the callees with priority ranking 2 (the second from tops of the lists).

However, since the importance of the callees with priority ranking 2 is both "none", a similar process is executed on priority ranking 3. As a result, whereas the importance of the callee for the user A is "none", the importance of the callee for the user C is "1", and thus the priority ranking of the user C is raised above the user A. As a result, the priority ranking of the user A is finalized at "3", and the priority ranking of the user C is finalized at "2". The finalized priority rankings are stored in the user ranking DB 125 (see FIG. 39).

Note that since the numbers of callees differs between the users being compared (for example, the number of callees for the user A is 3, while the number of callees for the user C is 2), in the case where there is no importance of a callee to be compared on one side, the callee of a ranking that does not exist is treated as importance "none". Also, in the case where a ranking is undetermined even after comparing all ranked callees for importance "1", the callee importance comparison is conducted in order from the top of the list for importance "2". Also, although in the above example only importance "1" is used for the proportion calculation, a tentative priority ranking may also be determined while taking importance "2" into account.

Returning to FIG. 22, when a priority ranking regarding the allocation of allowed calling time periods to users is determined in each restricted area by the processes up to this point, the processor 1 conducts the processing in the next S035 to S037 as the schedule determining process 127. In other words, for each restricted area for which to determine a schedule, the processor 1 checks the number of users (registered stations) to which to allocate an allowed calling time period, and stores the results in the schedule DB 128 (S035).

Next, the processor 1 determines a per-user allotted time (allowed calling time) for each restricted area (S036). Next, the processor 1 allocates an allowed calling time period to each user (determines a schedule), in accordance with the priority ranking stored in the user ranking DB 125 (S037). The schedule is stored in the schedule DB 128.

<<<Schedule Determining Process>>>

Figure 40:
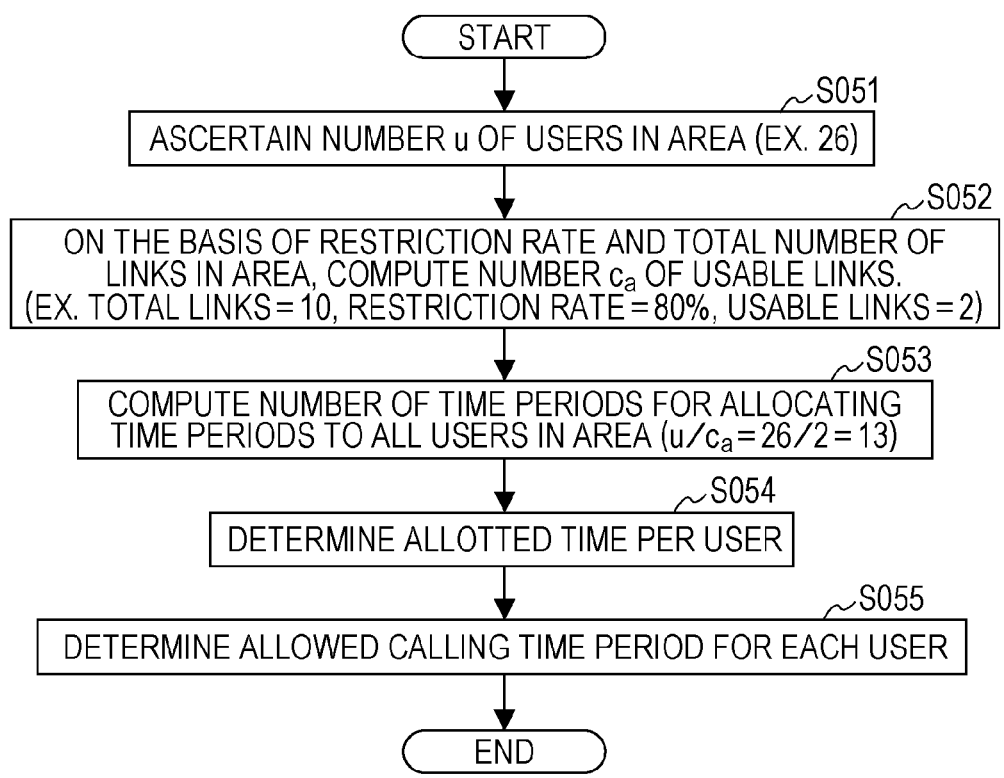
FIG. 40 is a flowchart illustrating exemplary details of a schedule determining process.

FIG. 40 is a flowchart illustrating exemplary details of the schedule determining process 127. The schedule determining process 127 is executed for each restricted area. The process illustrated in FIG. 40 may be executed following the process in S034 (FIG. 22).

First, for a given restricted area, the processor 1 ascertains the number of users (number of registered stations) u within that restricted area (S051). The number of users may be ascertained by referencing the number of users associated with that restricted area being stored in the user ranking DB 125. The example in FIG. 40 describes an example in which the number of users u is 26.

The number of users is stored in the schedule DB 128. FIG. 41 is an explanatory diagram for the schedule DB 128. The schedule DB 128 stores a table as illustrated in FIG. 41 for each restricted area for which to determine a schedule. The table stores a priority ranking, a user, a time period name, a start time, and an end time, for example. For the user, a name of a user of a registered station is registered. For the time period name, a number of a time period in which calling is allowed is registered. The start time is the start time of an allocated allowed calling time period. The end time is the end time of an allocated allowed calling time period. When the process in S051 ends, a priority ranking and user names become stored in the table.

Next, the processor 1 computes a number of usable links on the basis of the restriction rate for the restricted area and the total number of links (S052). The restriction rate for a restricted area may be received from the OpS 114 in the process in S015 (restriction information acquisition) of FIG. 16, and stored in the priority callee DB 123, for example. Also, the total number of links may be stored in the memory 2 or the HD 3 in advance, or alternatively, acquired by being received from a management device such as the OpS 114, for example.

At this point, provided that r (%) is the restriction rate for a restricted area, and $c_t$ is the total number of links, the number of usable links $c_a$ may be computed with the following Eq. 2.

$$c_a = c_t \times (1 - r/100) \qquad \text{Eq. 2}$$

For example, in the case where the total number of links $c_t$ for a restricted area is 10, and the restriction rate r is 80%, the number of usable links $c_a$ becomes 2 by using the above formula.

Next, the processor 1 computes a number of time periods through which cycles the allocation of allowed calling time periods cycles to all users in a restricted area. The number of time periods n may be computed with the following Eq. 3.

$$n = u/c_a \qquad \text{Eq. 3}$$

For example, in the case where the number of users u is 26, and the number of usable links $c_a$ is 2, the number of time periods n becomes 13. The processor 1 stores names corresponding to the number of the time periods in a table of the schedule DB 128. In the example illustrated in FIG. 41, the names "1" to "13" are set for 13 time periods, and a time period (time period name) is allocated to every two of the 26 users. For example, the time period name "1" is respectively allocated to the users with the priority rankings 1 and 2, while the time period name "2" is respectively allocated to the users with the priority rankings 3 and 4. In this way, the processor 1 computes a number of time periods by dividing the total number of users by the number of usable links, and allocates a time period to each user.

Next, the processor 1 references the allotted time definition DB 133, and determines an allotted time per user (S054). The allotted time per user may be set in advance (first technique). Also, the amount of time for the allocation of time periods to cycle through all users within an area may be set, and the allotted time per user may be computed from the number of time periods (second technique).

FIG. 42 illustrates an example of stored content in the allotted time definition DB 133 in the case of applying the first technique, while FIG. 43 illustrates an example of stored content in the allotted time definition DB 133 in the case of applying the second technique. In order to execute the first technique, the allotted time definition DB 133 stores a per-user allotted time (allowed calling time; a length of time) for each round of the schedule. In the example in FIG. 43, a time is also set for the second and subsequent rounds of the schedule, and lengths of time that are longer than the length of time for the first round of the schedule are set. However, the same times or shorter times may also be set.

In order to execute the second technique, as illustrated in FIG. 43, the allotted time definition DB 133 stores a cycle time (a length of time) for each round of the schedule. Likewise in the example of FIG. 43, the cycle times for the second and subsequent rounds are set to longer lengths of time, but the lengths of time may be set as appropriate. However, both the first technique and the second technique may be configured to present a warning if the person applying settings attempts to set the allotted time per user below a given threshold value. In so doing, it is possible to avoid unrealistic allocations in which the allotted time per user is too short to allow a call to even one priority callee.

Also, in the case of applying the second technique, the allotted time per user is calculated by dividing the cycle time by the number of time periods. In other words, provided that the $d_t$ is the time for time period allocation to cycle through all users, the allotted time $d_s$ per user is computed with the following Eq. 4.

$$d_s = d_t/n \qquad \text{Eq. 4}$$

The example illustrated in FIG. 43 illustrates the allotted time per user for the case in which the time $d_t$ for time period allocation to cycle through all users in the first round of the schedule is 30 minutes, and the number of time periods n is 30. Allotted times calculated in this way may be stored in the allotted time definition DB 133. With the second technique, in the case in which the number of usable links is fixed, the allotted time varies according to the number of users. Thus, whereas it is possible to lengthen the allotted time in a restricted area with a small number of registered stations, it is possible to shorten the allotted time in a restricted area with a large number of registered stations, and enable the calculation of an allotted time that ensures fairness according to the number of registered stations.

Returning to FIG. 40, if one of the above first and second techniques is used to determine the allotted time per user, the processor 1 determines an allowed calling time period for each user (S055). In other words, the start time of the cycle time for all users is determined, and from that start time, the start times and end times of allowed calling time periods are determined so as to secure an allotted time for each user. The allowed calling time periods (start times and end times) allocated to each user in this way are stored in the schedule DB 128, as illustrated in FIG. 41. When the process in S055 ends, the schedule for all users within the restricted area is finalized.

Note that in the case of computing the number of usable links in S052, mobile stations for which a priority callee list is not registered (unregistered stations) may also be taken into account. Conceivably, a mixture of registered stations and unregistered stations may be located in a restricted area. In order to enable a more realistic calculation of the number of links, a technique like the following may be applied.

Figure 44:
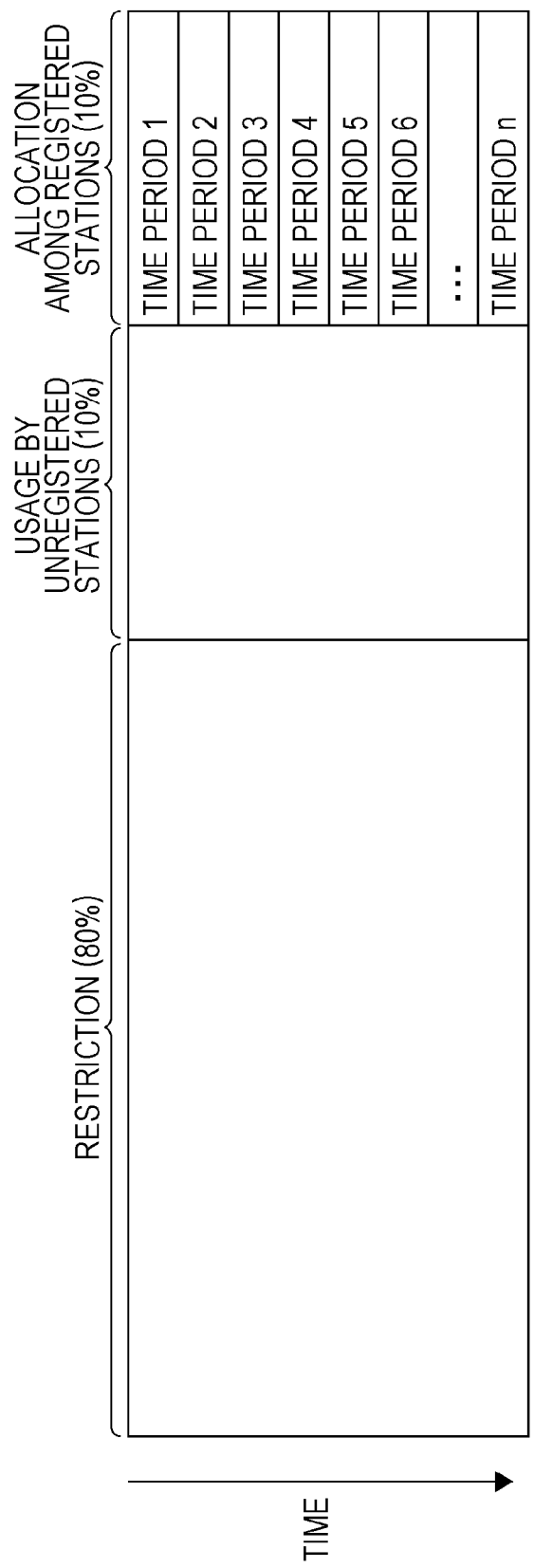
FIG. 44 is a diagram explaining a method of calculating the number of usable links while taking unregistered stations into account.

FIG. 44 is a diagram explaining a method of calculating the number of usable links while taking unregistered stations into account. The example illustrated in FIG. 44 illustrates an example in which the restriction rate of a restricted area is 80%, the allocation for use by unregistered stations is 10%, and the allocation for use by registered stations is 10%. In this case, provided that $r_c$ (%) is the proportion for use by unregistered stations, r (%) is the restriction rate within an area, and $c_t$ is the total number of links, the number of usable links $c_a$ is computed with the following Eq. 5. In S052, Eq. 5 may be used instead of Eq. 2. Thus, it is possible to determine links with respect to registered stations while in a state in which links are ensured with respect to unregistered stations.

$$c_a = c_t \times (1 - (r + r_c)/100) \qquad \text{Eq. 5}$$

Returning to FIG. 22, when a schedule is finalized for all users within a restricted area, a mobile station message directed at each registered station is created (S038), and allowed calling time periods (the schedule) is delivered to the mobile stations within a restricted area (S039).

The following three methods are conceivable as the schedule delivery method. In the first method, the control system 100 sends schedule information including the schedule for all users, like that illustrated in FIG. 41, to each base station 116 within a restricted area, and each base station 116 transmits system information including schedule information to that base station's cell. In this case, schedule information may be multicast to all registered stations.

In the second method, the control system 100 transmits schedule information including the schedule for all users to each registered station individually (unicast). In this case, the information to transmit (transmit content) may be the same among the registered stations.

In the third method, only the schedule record (entry) for a recipient registered station from the schedule illustrated in FIG. 41 is individually transmitted (unicast) to a relevant registered station. This case, although producing a process of generating transmit information for each registered station, is able to decrease the data size to transmit to each registered station. The following description assumes the transmission of a schedule by the second method as an example.

<<<Process in Mobile Station (Registered Station)>>>

Figure 45:
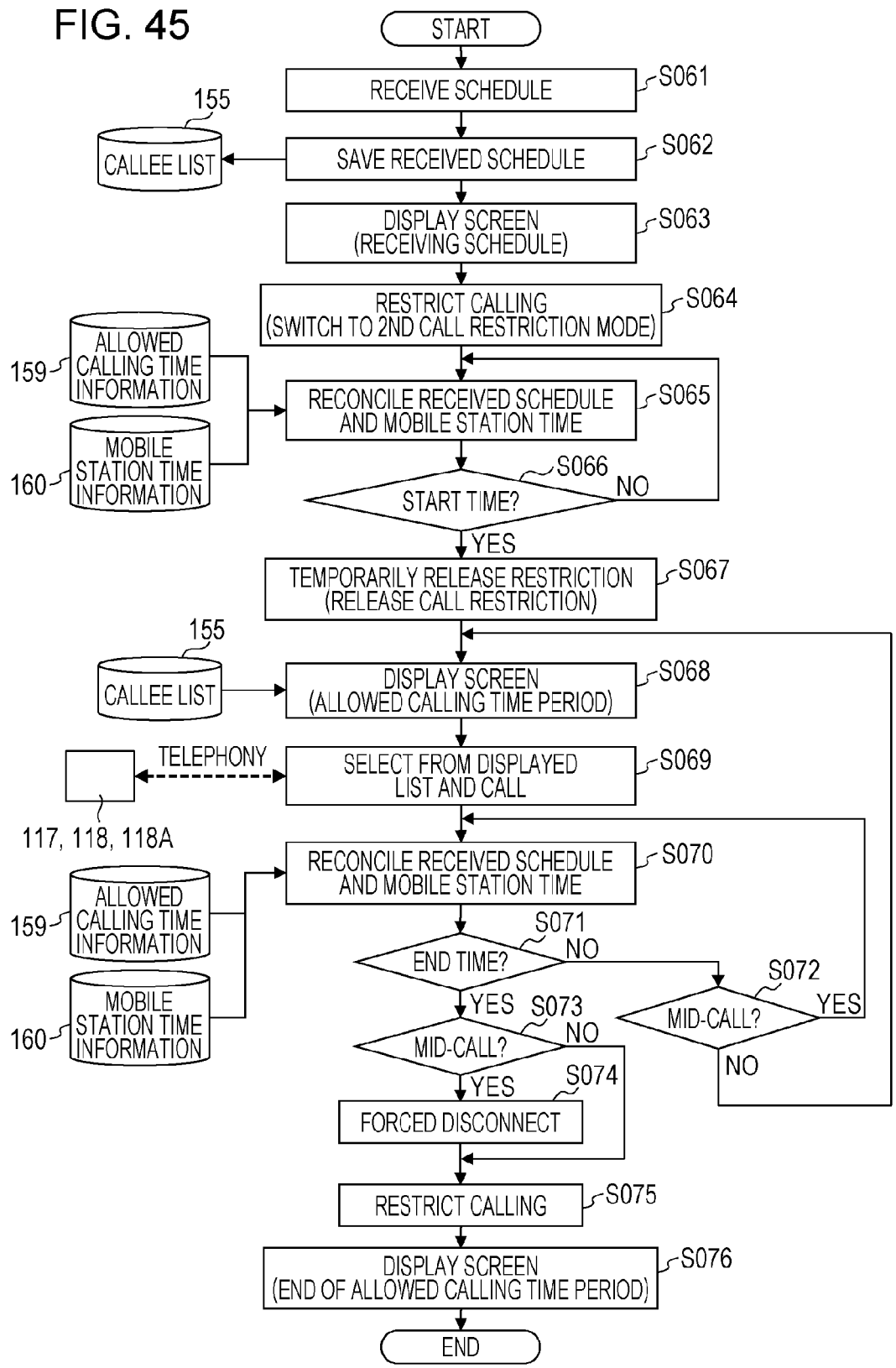
FIG. 45 is a flowchart illustrating an exemplary process in a mobile station (registered station) for schedule receiving and user calling until an allowed calling time period ends.

FIG. 45 is a flowchart illustrating an exemplary process in a mobile station 117 (registered station) for schedule receiving and user calling until an allowed calling time period ends. In FIG. 45, the processor 28 of the registered station receives schedule information from the control system 100 (S061: receiving process 152 (FIG. 7)).

Subsequently, the processor 28 stores schedule information in the callee list 155 as part of the schedule managing process 153. Also, the processor 28 retrieves the mobile station's own schedule (the start time and end time of an allowed calling time period) from the schedule information, and registers the retrieved schedule as the allowed calling time information 159.

Note that in the receiving process 152, the processor 28 may also receive schedule information together with the mobile station's own priority callee list from the control system, and store the schedule information and the priority callee list in the callee list 155 in S062. However, in the case of adopting a configuration in which the priority callee list generated in the list registering process 150 (FIG. 7) is stored in the callee list 155 in advance, the priority callee list may also not be received in the receiving process.

Next, as part of the schedule managing process 153, the processor 28 retrieves the priority callee list stored in the callee list 155 and the allowed calling time period set as the allowed calling time information 159, and executes the displaying process 154 (S063). In other words, the processor 28 edits screen data prepared in the memory 29 in advance to reflect priority callee list information and the allowed calling time period, and display a screen based on the screen data on a display included in the IO device 35.

Figure 46:
FIG. 46 illustrates an exemplary display screen when receiving a schedule.

FIG. 46 illustrates an exemplary display screen when receiving a schedule. The screen 180 is a display screen for informing the user of a registered station located within a restricted area that a call restriction is currently in effect. Displayed on the screen 180 is an indication that a call restriction is in effect, as well as an allowed calling time period (start time and end time) and a priority callee list.

Next, the processor 28 switches the state of the registered station to the second call restriction mode when triggered by receiving schedule information (corresponds to S064: call restriction/release deciding process 156, call restricting/releasing process 157). Next, the processor 28 compares the start time of the allowed calling time information to a current time provided as the mobile station time information 160 (S065), and determines whether or not the current time has reached the start time (S066: call restriction/release deciding process 156). The loop process of S065 and S066 is executed until the current time reaches the start time.

When the current time reaches the start time, the processor 28 temporarily releases the call restriction, and enters a state of accepting call operations from the user (S067: call restricting/releasing process 157). Subsequently, as part of the schedule managing process 153, the processor 28 retrieves the priority callee list stored in the callee list 155 and the allowed calling time period set as the allowed calling time information 159, and executes the displaying process 154 (S068). In other words, the processor 28 edits screen data prepared in the memory 29 in advance to reflect priority callee list information and the allowed calling time period, and display a screen based on the screen data on a display included in the IO device 35.

Figure 47:
FIG. 47 illustrates an exemplary display screen during an allowed calling time period.

FIG. 47 illustrates an exemplary display screen during an allowed calling time period. The screen 181 is a display screen for informing a user that he or she is in an allowed calling time period. Displayed on the screen 181 is an indication that calling is allowed, the allowed calling time period, and a priority callee list (the phone numbers of priority callees). Thus, the user is able to recognize that he or she is in an allowed calling time period, and make calls to priority callees.

Each phone number displayed on the screen 181 may be selected by a cursor operation, or by a touch operation using a touch panel, for example. If a call input is performed with a given phone number in a selected state, the processor 28 executes a calling process to that phone number (S069: restricted call process 158 (FIG. 7)). Thus, the user is able to use a registered station to conduct telephony with the station of a callee (any of a mobile station 117, a landline station 118, or a PHS station 118A). While in the allowed calling time period, the user is able to phone (make calls to) multiple priority callees.

When the current time passes the start time of the allowed calling time period, the processor 28 starts a comparison of the current time and the end time of the allowed calling time period (S070), and subsequently determines whether or not the current time has reached the end time (S071: call restriction/release deciding process 156). In the case where the current time has not reached the end time (S071; No), the processor 28 checks whether a call is in progress (S072), and if a call is in progress, allows the call to continue as-is (the process returns to S070).

In the case where a call is not in progress in S072, the processor 28 conducts the screen 181 displaying process, and prompts the user to call a priority callee (S068). After that, in the case of determining in S071 that the current time has reached or exceeded the end time, the processor 28 determines whether or not a call is in progress (S073), and if a call is in progress, conducts a forced disconnecting process (S074), and proceeds to S075. If a call is not in progress, the process proceeds to S075.

In S075, the processor 28 releases the temporary allowed calling state (S075: call restricting/releasing process 157), and switches to a state of not accepting call operations, with the exception of calling special numbers such as emergency numbers. Also, as part of the schedule managing process 153, the processor 28 accepts the end of the allowed calling time period, and executes the displaying process 154 (S076). In other words, the processor 28 displays a screen based on screen data prepared in the memory 29 in advance on a display included in the IO device 35.

Figure 48:
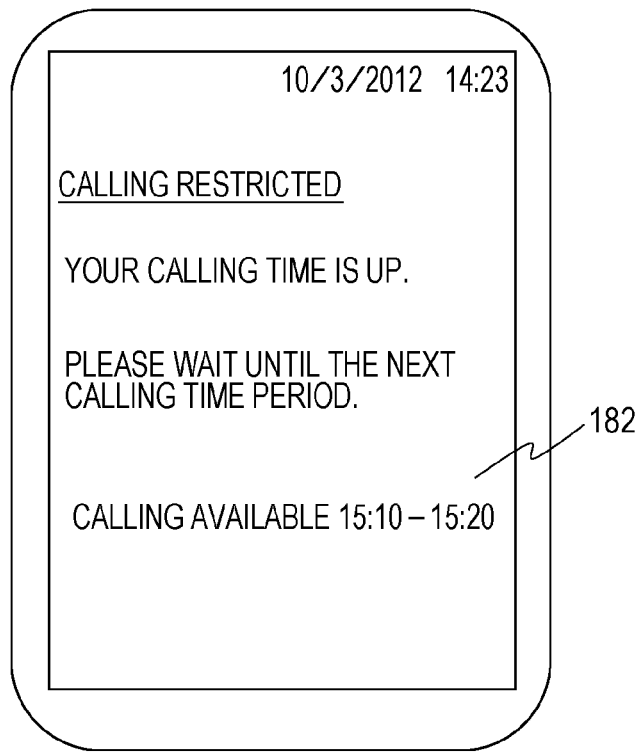
FIG. 48 illustrates an exemplary display screen when an allowed calling time period ends.

FIG. 48 illustrates an exemplary display screen when an allowed calling time period ends. The screen 182 is a display screen for announcing to (notifying) a user of the end of an allowed calling time period. The screen 182 displays an indication that a call restriction is in effect, as that an allowed calling time period has ended. Note that, as illustrated in FIG. 48, in the case of receiving a rescheduling result (the next schedule) from the control system 100 at the time of S076, the display content of the screen 182 may include the allowed calling time period for the next schedule. Thus, the user is able to recognize the end of an allowed calling time period, and refrain from useless calling.

Note that the phone numbers allowed to be called in an allowed calling time period are restricted to special numbers such as emergency numbers, and the phone numbers of priority callees. In the case where a call operation to other than these phone numbers is performed, the processor 28 aborts the call process, and does not make a call. Such call restriction is conducted by the mobile station 117.

<<<Operations of Control System Conducting Rescheduling>>>

Figure 49:
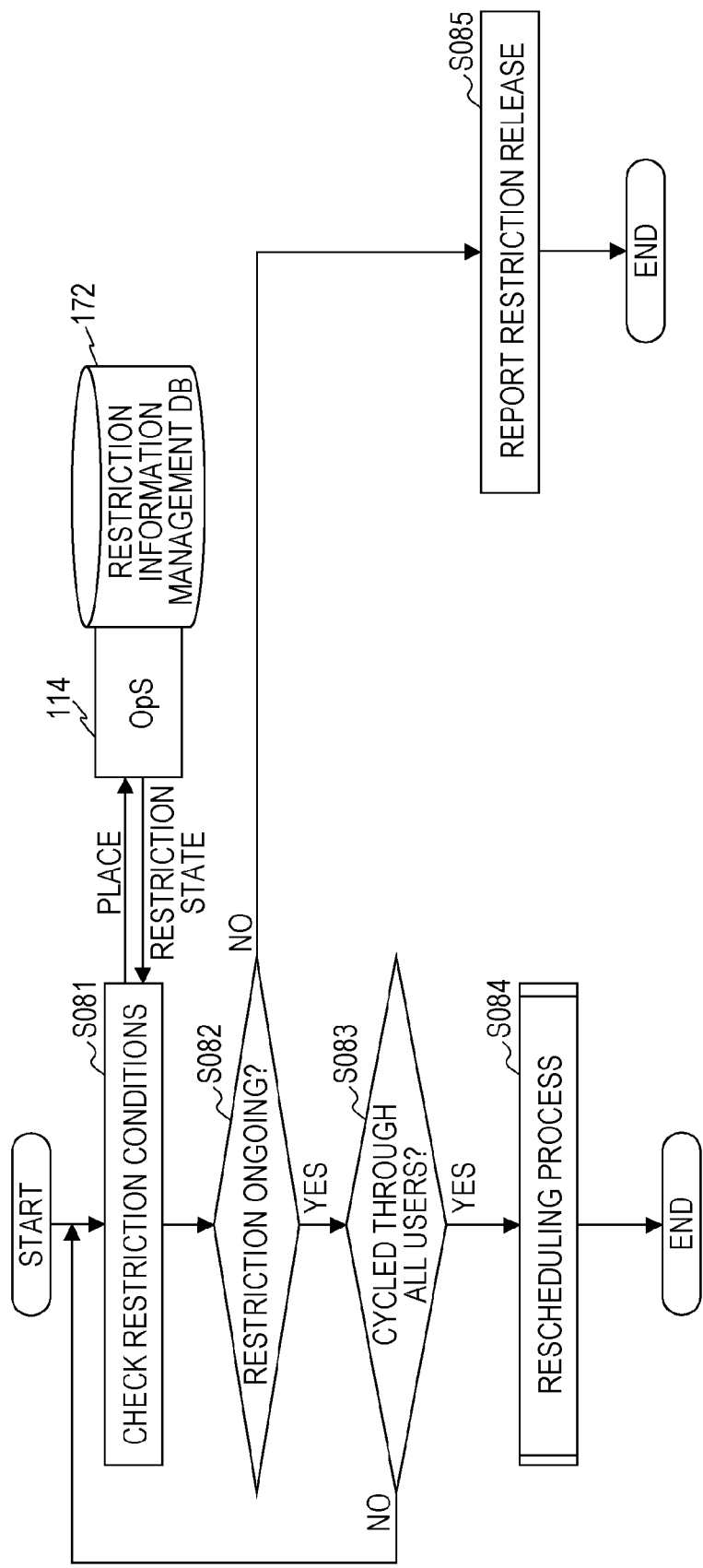
FIG. 49 is a flowchart illustrating exemplary operations of a control system conducting rescheduling.

FIG. 49 is a flowchart illustrating exemplary operations of a control system 100 conducting rescheduling. The control system 100, in order to check call restriction conditions in each restricted area, periodically acquires restriction information for each relevant area from the OpS 114 (S081).

The processor 1 of the control system 100 references the acquired restriction information for each area, and determines whether the call restriction for each area is ongoing or released (S082). The following process is conducted for each area in which a call restriction is ongoing.

In other words, the processor 1 determines whether or not the current time (obtained from an internal clock (not illustrated) included in the control system 100 (information processing device 100A)) has passed the end time of the cycle time corresponding to an area (the end time of the last allowed calling time period in the priority ranking) (S083). If the current time has passed the end time (S083; Yes), the processor 1 executes a rescheduling process (S084). Since the rescheduling process is nearly the same as the process from S012 to S020 (FIG. 16) and the process from S031 to S039 (FIG. 22) described heretofore, detailed description will be reduced or omitted. However, for the allotted time (allowed calling time length), a value corresponding to the round of the schedule is applied (see FIGS. 42 and 43).

In S082, for an area in which the restriction is determined to be released, the processor 1 generates a restriction release message (restriction release notification), and transmits the message to each registered station via the base stations 116 for that area (S085).

<<<Operations of Mobile Station when Call Restriction is Released>>>

Figure 50:
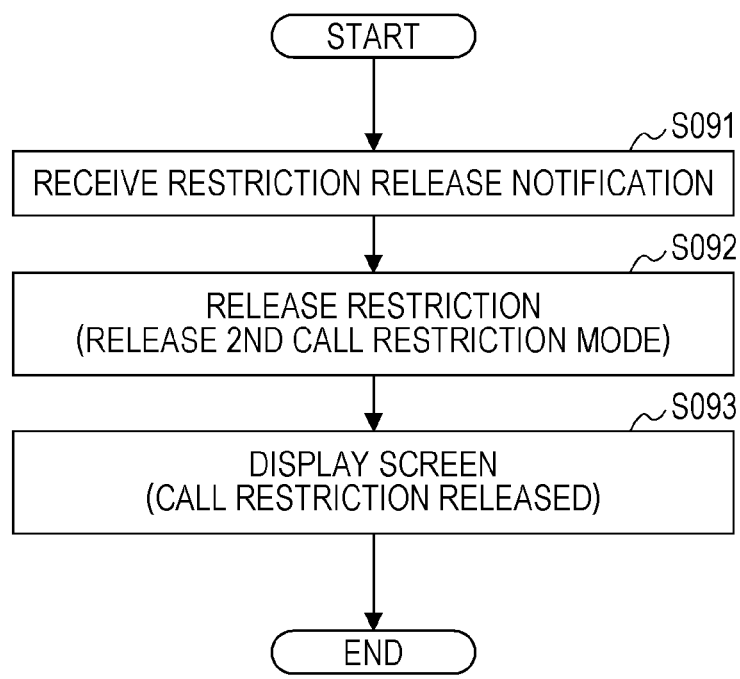
FIG. 50 is a flowchart illustrating exemplary operations of a mobile station when a call restriction is released.

FIG. 50 is a flowchart illustrating exemplary operations of a mobile station 117 when a call restriction is released. If a call restriction on a located area is released, a mobile station 117 (registered station) receives a restriction release notification from the control system 100 via a base station 116 (S091: receiving process 152).

Figure 51:
FIG. 51 illustrates an exemplary display screen of a call restriction release.

Subsequently, the processor 28 of the mobile station 117 decides, by receiving a restriction release notification, that the call restriction on the located area has been released (call restriction/release deciding process 156), and releases the second call restriction mode (S092). In addition, the processor 28 executes the displaying process 154, and displays a display screen indicating that the call restriction has been released on a display. FIG. 51 illustrates a display screen of a call restriction release. The screen 183 displays an indication that a call restriction has been released. Thus, a user is able to learn that, because of the restriction release, it is possible to freely make calls.

Note that as a result of releasing the second call restriction mode, the mobile station 117 may switch to normal mode (no call restriction), or switch from the second call restriction mode to the first call restriction mode, and then switch from the first call restriction mode to normal mode in the case of receiving a first call restriction mode release from system information. Alternatively, a configuration of not switching to the first call restriction mode on the basis of system information may also be applied to a mobile station 117 (registered station) able to switch to the second call restriction mode.

<<<Operations of Base Station and Mobile Station when Moving Outside Call-Restricted Area>>>

Figure 52:
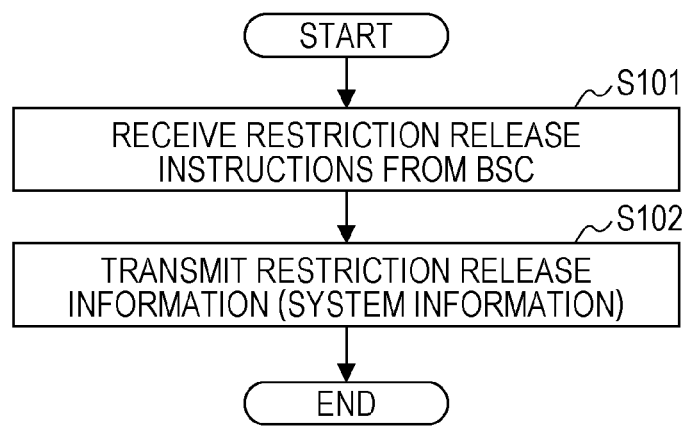
FIG. 52 is a flowchart illustrating exemplary operations of a base station in an unrestricted area.
Figure 53:
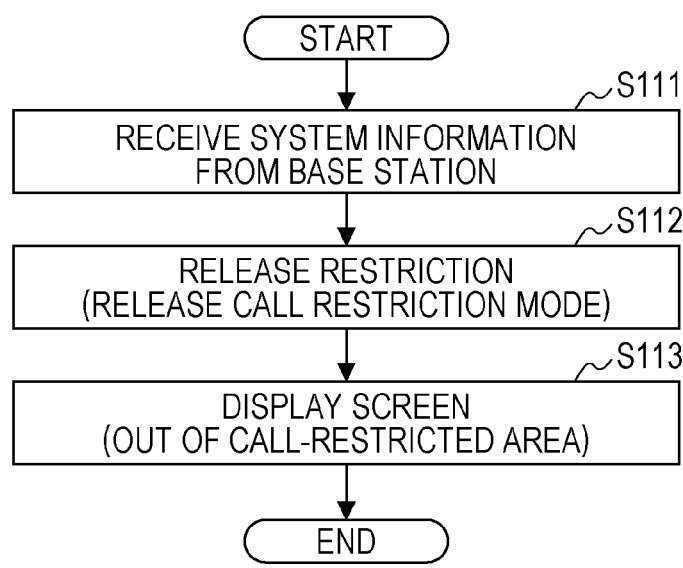
FIG. 53 is a flowchart explaining a process of a mobile station (registered station) moving from a restricted area to an unrestricted area.

FIG. 52 is a flowchart illustrating exemplary operations of a base station in an unrestricted area, while FIG. 53 is a flowchart explaining a process of a mobile station 117 (registered station) moving from a restricted area to an unrestricted area.

In FIG. 52, a base station 116 in an unrestricted area receives a message of restriction release instructions (indicating a call restriction of "none") from the OpS 114 via a BSC 115 (S101). The restriction release instructions are given to the CPU 16 via the link IF 15 (an example of the restriction information receiving process 142 in FIGS. 4 and 5).

The CPU 16, on the basis of the restriction release instructions, conducts a process of generating system information including restriction release information. The system information is transmitted to the cell (communication area) of the base station 116 from the antenna 11 (S102). In this way, in an unrestricted area, system information including restriction release information indicating a call restriction of "none" is periodically or regularly transmitted from a base station 116.

In FIG. 53, a mobile station 117 that has moved into an unrestricted area receives the above system information with the antenna 21 (FIG. 6) (S111: receiving process 152). Upon receiving restriction release information in the system information, the processor 28 decides that the restriction has been released (call restriction/release deciding process 156), and releases a call restriction by switching from the second call restriction mode to normal mode (S112: call restricting/releasing process 157).

Figure 54:
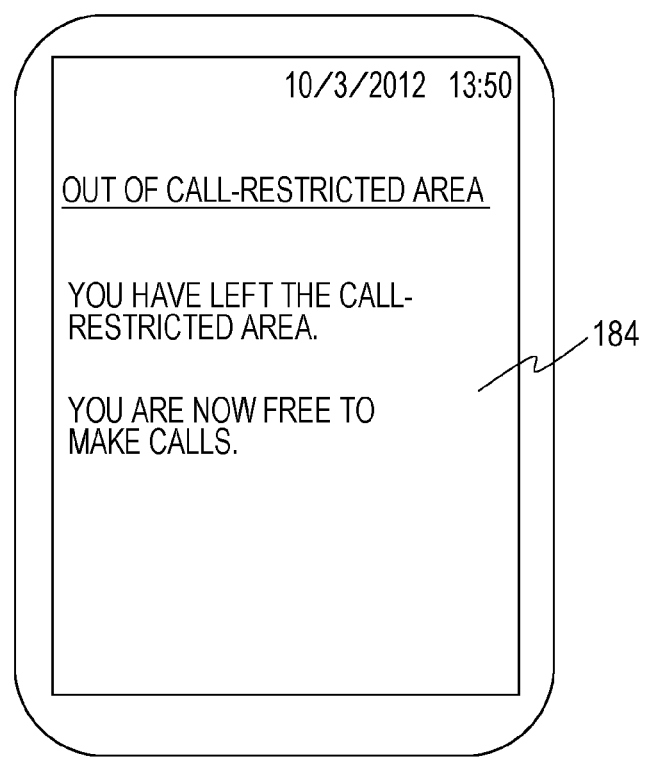
FIG. 54 illustrates an exemplary display screen when moving out of a restricted area.

Additionally, the processor 28 executes the displaying process 154, and displays a display screen indicating that the mobile station 117 has moved outside a call-restricted area (into an unrestricted area) on a display (S113). FIG. 54 illustrates an exemplary display screen when moving outside a call-restricted area (into an unrestricted area). The screen 184 displays an indication that the mobile station 117 has moved outside a call-restricted area (into an unrestricted area). Also, as illustrated in FIG. 54, there is displayed an indication that the user is able to freely make calls. Thus, the user is able to learn that he or she has moved outside a restricted area, and that it is possible to freely make calls.

Operational Advantages

According to a control system 100 in accordance with an embodiment, an allowed calling time period is allocated and reported to each registered station (restricted station) located in a call-restricted area (restricted area) with a specific restriction purpose, such as a disaster. A registered station is able to conduct telephony with priority callees in the allowed calling time period. Thus, compared to ordinary call restriction based on a call restriction rate (call restriction in the first call restriction mode), it is possible to reliably carry out telephony with priority callees, and in addition, ensure fairness among users.

Also, in order to allocate allowed calling time periods, the control system 100 determines an allowed calling time period allocation priority ranking with respect to multiple registered stations (that is, restricted stations) located in a given restricted area, on the basis of call restriction conditions in the located areas of each registered station as well as each priority callee. At this point, an importance of "1" is set in the case in which the registered station and the priority callee are both located in restricted areas, while an importance of "2" is set in the case in which the caller is located in a restricted area, but the priority callee is located in an unrestricted area. A priority ranking of registered stations is then determined in order of the largest proportion of importance "1". Thus, it is possible to allocate earlier allowed calling time periods to users with a more urgent demand to check conditions.

Also, in the case in which users with same priority ranking occur with the above proportion-based ranking, the control system 100 checks whether or not importance "1" is set with respect to the priority callees of these users in order from the tops of the lists, and in the case in which, for a given ranking, importance "1" is set for a given user while an importance lower than importance "1" is set for another user, the control system 100 raises the priority ranking of the given user over the priority ranking of the other user. Thus, it is possible to prioritize the allocation of allowed calling time periods to users with a higher importance.

Also, when allocating allowed calling time periods, the control system 100 calculates a number of links usable by registered stations on the basis of the call restriction rate and the number of links, and calculates a number of time periods to allocate to registered stations according to the number of links. Thus, it is possible to raise the reliability of link establishment through calling, and guarantee that telephony is carried out smoothly for a registered station in an allowed calling time period. Also, when calculating the number of usable links, it is also possible to calculate a number of links usable by registered stations that takes into account the restriction rate and usage by unregistered stations.

The allowed calling time length (allotted time) may be set to the same length among users. Thus, it is possible to ensure fairness among users. Also, although fixing the allotted time is possible, it is also possible to pre-define a cycle time length in which allowed calling times cycle through all users in a restricted area, and divide the cycle time by the number of users, and thereby vary the length of the allotted time according to the number of users (registered stations).

Meanwhile, a mobile station 117 (registered station) according to the present embodiment conducts a process of generating a priority callee list in advance, and registering the priority callee list in the control system 100. Thus, when located in a restricted area, a registered station is able to receive an allowed calling time period notification from the control system 100, and exchange information such as confirmations of safety via telephony with priority callees while in a second call restriction mode.

In other words, in the second call restriction mode, a registered station enters a state in which it is possible to call a priority callee, or in other words conduct telephony, in an allowed calling time period, and in which calling to numbers other than special numbers is restricted outside the allowed calling time period. Thus, it is possible to raise the reliability of telephony with a priority callee for a user of a registered station. On the other hand, by deterring repeating calling by users, it is possible to moderate congestion. Also, by restricting calls to callees other than priority callees (with the exception of special numbers) in the allowed calling time period, it is possible to moderate network congestion.

Also, for a registered station in the second call restriction mode, while a call restriction is in place (outside the allowed calling time), an allowed calling time period is reported by displaying the allowed calling time period on a display (FIG. 46, display screen 180). Thus, it is possible to restrain calling outside an allowed calling time, and moderate network congestion.

Also, for a registered station in an allowed calling time period (between the start time and the end time), an indication that calling is allowed and a priority callee list is displayed on a display (FIG. 47, display screen 181). Thus, it is possible to prompt a user to make calls to priority callees. The priority callee list may also be utilized as a callee number specifying screen (an operating screen for calling a priority callee).

Also, by restraining useless calling while in the second call restriction mode, it is furthermore possible to moderate squandered power consumption in a mobile station 117.

Also, in the case in which a call restriction is ongoing, the control system 100 re-determines an allowed calling time period for each restricted station in a restricted area (conducts rescheduling), thereby granting a user of a registered station another chance to attempt to call priority callees. In the second and subsequent rounds of scheduling, it is possible to set a longer allowed calling time length than in previous rounds.

According to a control system 100 in accordance with the present embodiment, it becomes possible to manage information on callees to whom the user of a mobile station 117 prioritizes calling when a disaster such as an earthquake or fire occurs (a priority callee list), and if such a disaster does occur, it becomes possible to allocate a time period in which the user of a mobile station 117 is able to conduct voice telephony with priority callees, on the basis of call restriction information for each area, and located area information for the mobile station user and the priority callees (family and friends).

According to a mobile station 117 in accordance with the present embodiment, when a disaster occurs, for example, the user of the mobile station 117 is able to learn when it is possible to call priority callees that the user registered in advance. For this reason, the user is able to stay calm and refrain from performing call operations until an allowed calling time period, without making desperate attempts to make calls.

According to a base station 116 in accordance with the present embodiment, when a disaster occurs, for example, the base station 116 transmits (relays) an allowed calling time period (schedule) for individual mobile stations 117 received from the control system 100 to each mobile station 117. Thus, it is possible to moderate repeated attempts to connect to another party due to the anxiety or frustration felt by a user of a mobile station 117 not knowing when calling will be possible. As a result, network congestion may be potentially contained or reduced.

According to an OpS 114 in accordance with the present embodiment, when a disaster occurs, for example, the OpS 114 transmits call restriction information for enforcing a call restriction to base stations 116 and the control system 100, thereby enabling the control system 100 to calculate and allocate allowed calling time periods for calling priority callees to mobile stations 117 located in a call-restricted area.

According to the present embodiment, an allowed calling time period scheduled for each user is reported to a user's own mobile station 117. As a result, since the user of a mobile station 117 within a call-restricted area is able to ascertain when it is possible to make calls, anxiety or frustration with respect to the chance to call is reduced. Meanwhile, for the telecommunication operator, reporting a time period in which calling is allowed to the user of a mobile station 117 may moderate desperate calling behavior, thus potentially containing or reducing network congestion.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control system comprising:
a storage device configured to store lists of priority callees in correspondence to respective mobile stations; and
a controller configured to execute a procedure, including:
  determining for restricted mobile stations, based upon call restriction information for call-restricted areas in which the restricted mobile stations are located and priority callees included on corresponding lists of priority callees, from among the lists of priority callees, corresponding allowed calling time periods in which calling is allowed by the restricted mobile stations to the priority callees on the corresponding lists of priority callees for the restricted mobile stations, and
  transmitting, to the restricted mobile stations, information indicating the allowed calling time periods of the restricted mobile stations.

2. The control system according to claim 1, wherein
the controller further determines, for the restricted mobile stations, priority rankings for allocation of the allowed calling time periods per restricted mobile station for priority callees on a corresponding list of priority callees for the restricted mobile station, based on the call restriction information.

3. The control system according to claim 2, wherein
the controller determines the priority rankings in order of largest proportion of a priority ranking of at least one priority callee on the corresponding list of priority callees per restricted mobile station.

4. The control system according to claim 3, wherein:
a plurality of priority callees included on the list have a list ranking, and
the procedure executed by controller further includes:
  setting a highest importance priority ranking to a priority callee on the corresponding list of priority callees for the restricted mobile station in a case the restricted mobile station and the priority callee are both located in a call-restricted area among the call-restricted areas, and
  for a first and second restricted mobile stations with same proportion of priority callees located in the call-restricted area and with same list ranking, checking whether a highest importance priority ranking is set for priority callees on the corresponding lists of priority callees of the first and second restricted mobile stations, and in a case in which a highest importance is set for a priority callee of the first restricted mobile station but a highest importance is not set for a priority callee of the second restricted mobile station, setting a list ranking of the first restricted mobile station higher than the second restricted mobile station.

5. The control system according to claim 1, wherein the controller calculates a number of time periods allocable to the restricted mobile stations, based on a call restriction rate of a call-restricted area among the call-restricted areas, and a number of links usable by the restricted mobile stations.

6. The control system according to claim 5, wherein the controller calculates the number of links usable by the restricted mobile stations while taking into account the call restriction rate of the call-restricted area, and links used by the mobile stations for which calling is restricted in accordance with the call restriction rate.

7. The control system according to claim 1, wherein the allowed calling time periods are same for the restricted mobile stations.

8. The control system according to claim 7, wherein the allowed calling time periods are determined per restricted mobile station.

9. The control system according to claim 7, wherein the procedure executed by the controller further includes:
calculating a cycle time in which the allowed calling time periods cycle through the restricted mobile stations located in a call-restricted area among the call-restricted areas, and
calculating an allowed calling time period to allocate to a restricted mobile station among the restricted mobile stations, based on the calculated cycle time and a number of the restricted mobile stations.

10. The control system according to claim 1, wherein the procedure executed by the controller further includes:
in response to detecting based upon the call restriction information that a call restriction state for a call-restricted area among the call-restricted areas is ongoing after the transmitting the allowed calling time periods, re-determining allowed calling time periods for the call-restricted area.

11. A mobile station comprising:
a transmitter configured to transmit, via at least one network, to a control system, a list of priority callees of the mobile station for use during a call restriction for a call-restricted area in which the mobile station is located;
a receiver configured to receive, from the control system via the network during the call restriction for the call-restricted area, information indicating an allowed calling time period in which calling to the priority callees by the mobile station is allowed; and
a controller configured to allow calling to only ordinary numbers that correspond to the priority callees of the mobile station in the allowed calling time period, and restrict calling to ordinary numbers outside the allowed calling time period.

12. The mobile station according to claim 11, wherein
the controller determines the allowed calling time period outside of the allowed calling time period, and
the mobile station announces the allowed calling time period.

13. The mobile station according to claim 11, wherein
in the allowed calling time period, the controller generates an indication that calling is allowed, and the list of priority callees of the mobile station, and
the mobile station announces the indication and the list of priority callees of the mobile station.

14. A call restriction method comprising:
by a mobile station, transmitting, to a control system via at least one network, a list of priority callees of the mobile station for use during a call restriction for a call-restricted area in which the mobile station is located;

by the control system, executing:

in response to the call restriction for the mobile terminal, determining, based on the priority callees of the restricted mobile station, an allowed calling time period in which calling is allowed by the restricted mobile station to the priority callees of the restricted mobile station, and transmitting, via the at least one network, to the restricted mobile station, information indicating the allowed calling time period;

wherein in response to receiving the information indicating the allowed calling time period, by the restricted mobile station executing:

allowing calling to only ordinary numbers that correspond to the priority callees of the restricted mobile station in the allowed calling time period; and restricting calling to ordinary numbers outside the allowed calling time period.

\* \* \* \* \*